(12) United States Patent
Minakuchi et al.

(10) Patent No.: US 11,453,205 B2
(45) Date of Patent: Sep. 27, 2022

(54) INTERLAYER FOR LAMINATED GLASS, AND LAMINATED GLASS

(71) Applicant: SEKISUI CHEMICAL CO., LTD., Osaka (JP)

(72) Inventors: Nami Minakuchi, Kouka (JP); Tatsuya Iwamoto, Kouka (JP); Kohei Kani, Kouka (JP); Jun Sasaki, Kouka (JP); Yuuma Takeda, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 315 days.

(21) Appl. No.: 16/075,618

(22) PCT Filed: Feb. 3, 2017

(86) PCT No.: PCT/JP2017/004093
§ 371 (c)(1),
(2) Date: Aug. 4, 2018

(87) PCT Pub. No.: WO2017/135448
PCT Pub. Date: Aug. 10, 2017

(65) Prior Publication Data
US 2019/0047262 A1 Feb. 14, 2019

(30) Foreign Application Priority Data

Feb. 5, 2016 (JP) .............................. JP2016-021342
Feb. 5, 2016 (JP) .............................. JP2016-021343
(Continued)

(51) Int. Cl.
*B32B 17/10* (2006.01)
*B32B 27/30* (2006.01)
*B32B 27/36* (2006.01)

(52) U.S. Cl.
CPC .. *B32B 17/10761* (2013.01); *B32B 17/10018* (2013.01); *B32B 17/10036* (2013.01);
(Continued)

(58) Field of Classification Search
CPC ........ B32B 17/10018; B32B 17/10036; B32B 17/10605; B32B 17/10761;
(Continued)

(56) References Cited

U.S. PATENT DOCUMENTS

2012/0244329 A1 9/2012 Iwamoto et al.
2012/0244364 A1 9/2012 Iwamoto et al.
(Continued)

FOREIGN PATENT DOCUMENTS

CN 103140451 A 6/2013
CN 103492339 A 1/2014
(Continued)

OTHER PUBLICATIONS

Supplementary European Search Report for the Application No. EP 17 747 599.3 dated Aug. 23, 2019.
(Continued)

*Primary Examiner* — Callie E Shosho
*Assistant Examiner* — Krupa Shukla
(74) *Attorney, Agent, or Firm* — Cheng Law Group, PLLC

(57) ABSTRACT

An interlayer film for laminated glass has enhanced sound insulating properties at 30° C., and includes first and second layers each containing a thermoplastic resin and a plasticizer. When an absolute value of a difference in cloud point using the thermoplastic resin and plasticizer in each of the first and second layers is Xa, and a content in parts by weight of the entire plasticizer in the interlayer film relative to 100 parts by weight of the entire thermoplastic resin in the interlayer film Z, the interlayer film satisfies the first con-
(Continued)

stitution: "Xa≤115 and Z≤−0.16Xa+59" and/or the second constitution: "the thermoplastic resin in the first layer is polyvinyl acetal resin, and when the acetylation degree on a mole percent basis of the polyvinyl acetal resin in the first layer is represented by Y, Y≥2 and Z≤−0.16Xa−0.2Y+59".

22 Claims, 1 Drawing Sheet

(30) Foreign Application Priority Data

Feb. 5, 2016 (JP) .............................. JP2016-021344
Feb. 5, 2016 (JP) .............................. JP2016-021345

(52) U.S. Cl.
CPC ...... *B32B 17/10605* (2013.01); *B32B 27/308* (2013.01); *B32B 27/365* (2013.01); *B32B 2250/03* (2013.01); *B32B 2307/102* (2013.01); *B32B 2367/00* (2013.01); *B32B 2605/006* (2013.01)

(58) Field of Classification Search
CPC .......... B32B 2250/03; B32B 2307/102; B32B 2367/00; B32B 2605/006; B32B 27/308; B32B 27/365
See application file for complete search history.

(56) References Cited

U.S. PATENT DOCUMENTS

| | | | |
|---|---|---|---|
| 2012/0263958 A1 | 10/2012 | Iwamoto et al. | |
| 2012/0288722 A1 | 11/2012 | Iwamoto et al. | |
| 2013/0183532 A1 | 7/2013 | Shimamoto et al. | |
| 2014/0044941 A1 | 2/2014 | Shimamoto et al. | |
| 2014/0093739 A1 | 4/2014 | Iwamoto et al. | |
| 2014/0227536 A1 | 8/2014 | Iwamoto et al. | |
| 2014/0227537 A1 | 8/2014 | Shimamoto et al. | |
| 2016/0121584 A1 | 5/2016 | Iwamoto et al. | |
| 2016/0279905 A1 | 9/2016 | Iwamoto et al. | |
| 2016/0311199 A1 | 10/2016 | Iwamoto et al. | |
| 2017/0072665 A1 | 3/2017 | Iwamoto et al. | |
| 2017/0217132 A1 | 8/2017 | Iwamoto et al. | |
| 2021/0162715 A1 | 6/2021 | Iwamoto et al. | |

FOREIGN PATENT DOCUMENTS

| | | | | |
|---|---|---|---|---|
| CN | 104987638 A | | 10/2015 | |
| EP | 2520552 A1 | * | 11/2012 | ....... B32B 17/10761 |
| EP | 2 623 474 A1 | | 8/2013 | |
| EP | 2 803 648 A1 | | 11/2014 | |
| JP | 2001-48600 A | | 2/2001 | |
| JP | 2007-70200 A | | 3/2007 | |
| JP | 2011-207762 A | | 10/2011 | |
| JP | 2015-117142 A | | 6/2015 | |
| WO | WO-2011/078313 A1 | | 6/2011 | |
| WO | WO-2011/078314 A1 | | 6/2011 | |
| WO | WO-2011/081190 A1 | | 7/2011 | |
| WO | WO-2011/081191 A1 | | 7/2011 | |
| WO | WO-2012/141002 A1 | | 10/2012 | |
| WO | WO-2015/108118 A1 | | 7/2015 | |
| WO | WO-2015/108119 A1 | | 7/2015 | |
| WO | WO-2015/147302 A1 | | 10/2015 | |

OTHER PUBLICATIONS

The First Office Action for the Application No. 201780009553.5 from the State Intellectual Property Office of the People's Republic of China dated Sep. 28, 2020.
Notification of Reasons for Refusal for the Application No. 2017-511369 from Japan Patent Office dated Aug. 31, 2021.
European Office Action for Application No. EP 17 747 599.3 dated Nov. 2, 2021.
International Search Report for Application No. PCT/JP2017/004092 dated May 16, 2017.
International Search Report for Application No. PCT/JP2017/004093 dated May 16, 2017.
International Preliminary Report on Patentabiiiity (PCT/IPEA/409) for the Application No. PCT/JP2017/004093 dated May 7, 2018.
Written Opinion of the International Searching Authority (PCT/ISA/237) for Application No. PCT/JP2017/004092 dated May 16, 2017 (English Translation dated Aug. 16, 2018).

* cited by examiner

[FIG. 1]
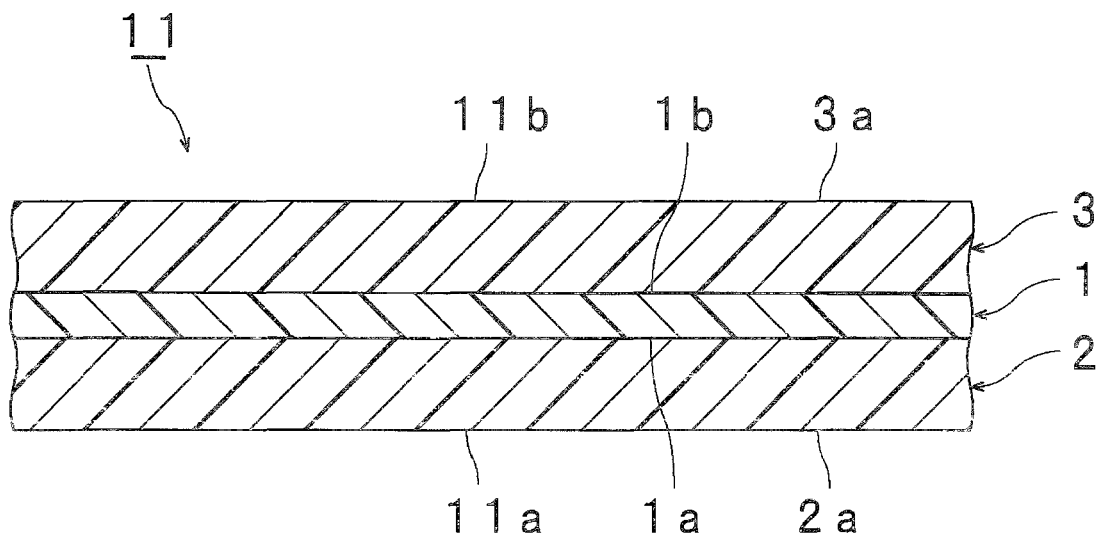
[FIG. 2]
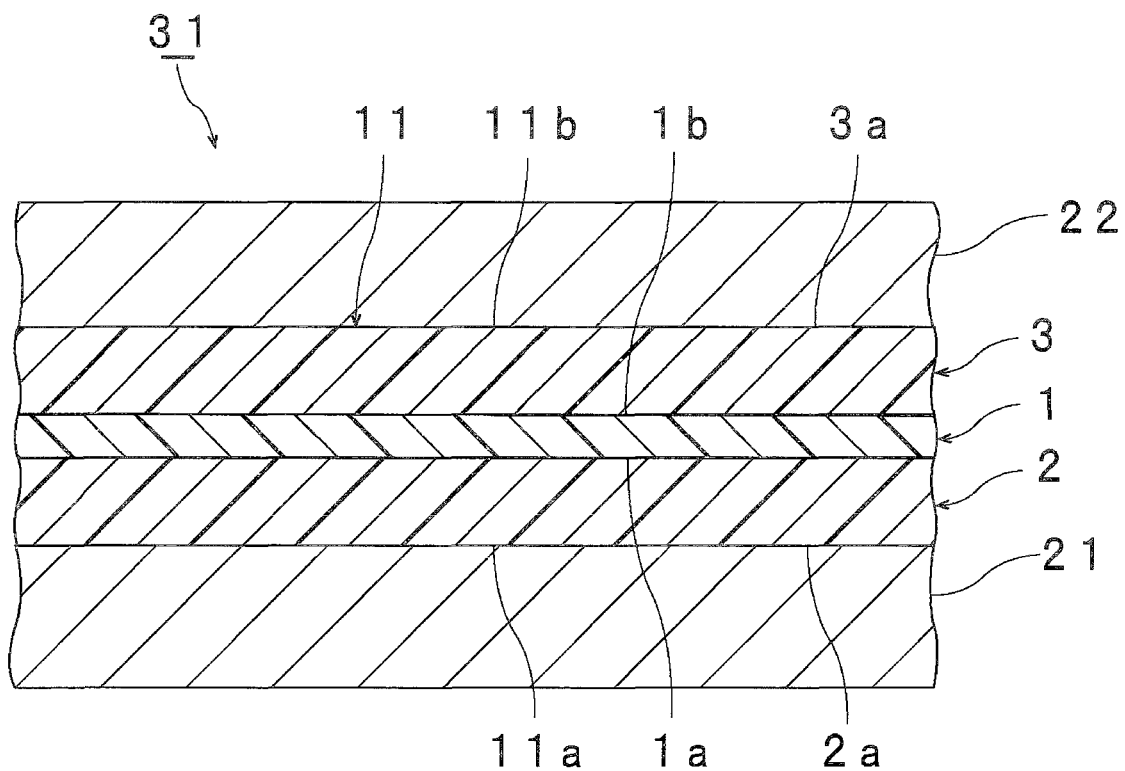

INTERLAYER FOR LAMINATED GLASS, AND LAMINATED GLASS

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between two glass plates.

Examples of the interlayer film for laminated glass include a single-layered interlayer film having a one-layer structure and a multi-layered interlayer film having a two or more-layer structure.

As an example of the interlayer film for laminated glass, the following Patent Document 1 discloses a sound insulating layer including 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount more than 30 parts by weight. This sound insulating layer can be used alone as a single-layered interlayer film.

Furthermore, the following Patent Document 1 also describes a multi-layered interlayer film in which the sound insulating layer and another layer are layered. Another layer to be layered with the sound insulating layer includes 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount of 30 parts by weight or less.

RELATED ART DOCUMENTS

Patent Document
    Patent Document 1: JP 2007-070200 A

SUMMARY OF THE INVENTION

Problems to be Solved by the Invention

Laminated glass is often exposed to not only an environment around 20° C. but also an environment around 30° C. In recent years, an interlayer film capable of providing laminated glass excellent in not only sound insulating properties around 20° C. but also sound insulating properties around 30° C. has been desired.

In the laminated glass including a conventional interlayer film as described in Patent Document 1, after preparation of the laminated glass, the sound insulating properties at 30° C. are degraded, so that the sound insulating properties of the laminated glass at 30° C. may not sufficiently increase. In addition, in the laminated glass including a conventional interlayer film, the sound insulating properties of the laminated glass at both 20° C. and 30° C. may not sufficiently increase.

An object of the present invention is to provide an interlayer film for laminated glass capable of being enhanced in sound insulating properties of laminated glass at 30° C. The present invention further provides, as a preferable interlayer film, an interlayer film for laminated glass capable of being enhanced in sound insulating properties of laminated glass at both 20° C. and 30° C. Moreover, the present invention is also aimed at providing laminated glass prepared with the interlayer film for laminated glass.

Means for Solving the Problems

According to a broad aspect of the present invention, there is provided an interlayer film for laminated glass (in the present specification, sometimes abbreviated as "the interlayer film") having a two or more-layer structure, the interlayer film for laminated glass including a first layer and a second layer layered on a first surface of the first layer, the first layer containing a thermoplastic resin and a plasticizer, the second layer containing a thermoplastic resin and a plasticizer, and when an absolute value of a difference between a cloud point measured by using a liquid prepared by dissolving 8 parts by weight of the thermoplastic resin in the first layer in 100 parts by weight of the plasticizer in the first layer and a cloud point measured by using a liquid prepared by dissolving 8 parts by weight of the thermoplastic resin in the second layer in 100 parts by weight of the plasticizer in the second layer being represented by Xa, and a content based on parts by weight of an entire plasticizer in the interlayer film for laminated glass relative to 100 parts by weight of an entire thermoplastic resin in the interlayer film for laminated glass being represented by Z, the interlayer film satisfying at least one of a first constitution and a second constitution below.

First constitution: $Xa \leq 115$ and $Z \leq -0.16Xa+59$

Second constitution: the thermoplastic resin in the first layer is a polyvinyl acetal resin, and when an acetylation degree based on mole percent of the polyvinyl acetal resin in the first layer is represented by Y, $Y \geq 2$ and $Z \leq -0.16Xa-0.2Y+59$ In a specific aspect of the interlayer film according to the present invention, the interlayer film satisfies the first constitution.

In a specific aspect of the interlayer film according to the present invention, the interlayer film satisfies the second constitution.

In a specific aspect of the interlayer film according to the present invention, the thermoplastic resin in the first layer is a polyvinyl acetal resin, and the thermoplastic resin in the second layer is a polyvinyl acetal resin.

In a specific aspect of the interlayer film according to the present invention, the thermoplastic resin in the first layer is a polyvinyl acetal resin, and the acetylation degree of the polyvinyl acetal resin in the first layer is less than 24% by mole.

In a specific aspect of the interlayer film according to the present invention, the thermoplastic resin in the first layer is a polyvinyl acetal resin, and a content of a hydroxyl group of the polyvinyl acetal resin in the first layer is 22% by mole or more.

In a specific aspect of the interlayer film according to the present invention, a content of the plasticizer in the first layer relative to 100 parts by weight of the thermoplastic resin in the first layer is larger than a content of the plasticizer in the second layer relative to 100 parts by weight of the thermoplastic resin in the second layer.

In a specific aspect of the interlayer film according to the present invention, the content of the plasticizer in the first layer relative to 100 parts by weight of the thermoplastic resin in the first layer is 50 parts by weight or more and 100 parts by weight or less.

In a specific aspect of the interlayer film according to the present invention, a content of the plasticizer in the second layer relative to 100 parts by weight of the thermoplastic resin in the second layer is 50 parts by weight or less.

In a specific aspect of the interlayer film according to the present invention, the content of the plasticizer in the second layer relative to 100 parts by weight of the thermoplastic resin in the second layer is more than 25 parts by weight.

In a specific aspect of the interlayer film according to the present invention, the thermoplastic resin in the first layer is a polyvinyl acetal resin, the thermoplastic resin in the second layer is a polyvinyl acetal resin, and the content of the hydroxyl group of the polyvinyl acetal resin in the first layer is lower than a content of a hydroxyl group of the polyvinyl acetal resin in the second layer.

In a specific aspect of the interlayer film according to the present invention, the interlayer film is an interlayer film for laminated glass having a three or more-layer structure, wherein the interlayer film for laminated glass includes a third layer layered on a second surface opposite to the first surface of the first layer, the third layer contains a thermoplastic resin and a plasticizer, and when an absolute value of a difference between a cloud point measured by using a liquid prepared by dissolving 8 parts by weight of the thermoplastic resin in the first layer in 100 parts by weight of the plasticizer in the first layer and a cloud point measured by using a liquid prepared by dissolving 8 parts by weight of the thermoplastic resin in the third layer in 100 parts by weight of the plasticizer in the second layer is represented by Xb, and the content based on parts by weight of the entire plasticizer in the interlayer film for laminated glass relative to 100 parts by weight of the entire thermoplastic resin in the interlayer film for laminated glass is represented by Z, the interlayer film satisfies at least one of a third constitution and a fourth constitution below.

Third constitution: Xb≤115 and Z≤−0.16Xb+59

Fourth constitution: the thermoplastic resin in the first layer is a polyvinyl acetal resin, and when an acetylation degree based on a mole percent of the polyvinyl acetal resin in the first layer is represented by Y, Y≥2 and Z≤−0.16Xb−0.2Y+59

In a specific aspect of the interlayer film according to the present invention, the interlayer film satisfies the third constitution.

In a specific aspect of the interlayer film according to the present invention, the interlayer film satisfies the fourth constitution.

In a specific aspect of the interlayer film according to the present invention, the thermoplastic resin in the first layer is a polyvinyl acetal resin, the thermoplastic resin in the second layer is a polyvinyl acetal resin, and the thermoplastic resin in the third layer is a polyvinyl acetal resin.

In a specific aspect of the interlayer film according to the present invention, a content of the plasticizer in the first layer relative to 100 parts by weight of the thermoplastic resin in the first layer is larger than a content of the plasticizer in the second layer relative to 100 parts by weight of the thermoplastic resin in the second layer, and the content of the plasticizer in the first layer relative to 100 parts by weight of the thermoplastic resin in the first layer is larger than a content of the plasticizer in the third layer relative to 100 parts by weight of the thermoplastic resin in the third layer.

In a specific aspect of the interlayer film according to the present invention, the content of the plasticizer in the second layer relative to 100 parts by weight of the thermoplastic resin in the second layer is 50 parts by weight or less, and the content of the plasticizer in the third layer relative to 100 parts by weight of the thermoplastic resin in the third layer is 50 parts by weight or less.

In a specific aspect of the interlayer film according to the present invention, the thermoplastic resin in the first layer is a polyvinyl acetal resin, the thermoplastic resin in the second layer is a polyvinyl acetal resin, the thermoplastic resin in the third layer is a polyvinyl acetal resin, a content of a hydroxyl group of the polyvinyl acetal resin in the first layer is lower than a content of a hydroxyl group of the polyvinyl acetal resin in the second layer, and the content of the hydroxyl group of the polyvinyl acetal resin in the first layer is lower than a content of a hydroxyl group of the polyvinyl acetal resin in the third layer.

In a specific aspect of the interlayer film according to the present invention, Z≥−0.16Xa−0.2Y+40 is satisfied.

According to a broad aspect of the present invention, there is provided a laminated glass including a first lamination glass member, a second lamination glass member and the interlayer film for laminated glass described above, the interlayer film for laminated glass being arranged between the first lamination glass member and the second lamination glass member.

Effect of the Invention

The interlayer film for laminated glass according to the present invention is an interlayer film for laminated glass having a two or more-layer structure, and includes a first layer and a second layer layered on a first surface of the first layer. In this interlayer film for laminated glass, the first layer contains a thermoplastic resin and a plasticizer, the second layer contains a thermoplastic resin and a plasticizer, and when an absolute value of a difference between a cloud point measured by using a liquid prepared by dissolving 8 parts by weight of the thermoplastic resin in the first layer in 100 parts by weight of the plasticizer in the first layer and a cloud point measured by using a liquid prepared by dissolving 8 parts by weight of the thermoplastic resin in the second layer in 100 parts by weight of the plasticizer in the second layer is represented by Xa and a content based on parts by weight of an entire plasticizer in the interlayer film for laminated glass relative to 100 parts by weight of an entire thermoplastic resin in the interlayer film for laminated glass is represented by Z, the interlayer film satisfies at least one of a first constitution and a second constitution. Consequently, sound insulating properties of laminated glass at 30° C. can be enhanced.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an example of laminated glass prepared with the interlayer film for laminated glass shown in FIG. 1.

MODE(S) FOR CARRYING OUT THE INVENTION

Hereinafter, the present invention will be described in detail.

The interlayer film for laminated glass (in the present specification, sometimes abbreviated as "the interlayer film") according to the present invention has a two or more-layer structure. The interlayer film according to the present invention may have a two-layer structure, may have a three-layer structure, may have a three or more-layer structure, and may have a four or more-layer structure.

The interlayer film according to the present invention includes a first layer and a second layer. The second layer is layered on a first surface of the first layer. The first layer contains a thermoplastic resin and a plasticizer. The second layer contains a thermoplastic resin and a plasticizer. The second layer may be an outermost layer (surface layer), and another layer may be layered on the opposite side of a surface of the second layer on which the first layer is layered. The second layer is preferably a layer layered on a lamination glass member. A surface of the second layer, which is opposite to the first layer side, is preferably a surface on which the lamination glass member or a glass plate is layered.

In the interlayer film according to the present invention, an absolute value of a difference between a cloud point measured by using a liquid prepared by dissolving 8 parts by weight of the thermoplastic resin in the first layer in 100 parts by weight of the plasticizer in the first layer and a cloud point measured by using a liquid prepared by dissolving 8 parts by weight of the thermoplastic resin in the second layer in 100 parts by weight of the plasticizer in the second layer is represented by Xa (% by mole), and a content based on parts by weight of the entire plasticizer in the interlayer film relative to 100 parts by weight of the entire thermoplastic resin in the interlayer film is Z (part(s) by weight). The interlayer film according to the present invention satisfies at least one of a first constitution and a second constitution.

First constitution: Xa≤115 (Formula Aa1) and Z≤−0.16Xa+59 (Formula Ba1)

Second constitution: the thermoplastic resin in the first layer is a polyvinyl acetal resin, and when an acetylation degree based on a mole percent of the polyvinyl acetal resin in the first layer is represented by Y (% by mole), Y≥2 (Formula A2) and Z≤−0.16Xa−0.2Y+59 (Formula Ba2)

Since the interlayer film according to the present invention is provided with the above-mentioned constitution, the sound insulating properties of laminated glass at 30° C. can be enhanced. In addition, in the present invention, the sound insulating properties of laminated glass at 20° C. can be enhanced. That is, in the present invention, the sound insulating properties of laminated glass at both 20° C. and 30° C. can be enhanced.

The present inventors have found that the degree of transfer of the plasticizer between layers has an effect on degradation of the sound insulating properties at 20° C. and 30° C., and further have found that when the above two formulas (Aa1) and (Ba1) are satisfied or when the above two formulas (A2) and (Ba2) are satisfied, the sound insulating properties at 30° C. effectively increase.

The interlayer film according to the present invention is preferably includes a third layer. The third layer is layered on a second surface opposite to the first surface of the first layer. It is preferred that the third layer contain a thermoplastic resin and a plasticizer. The third layer may be an outermost layer (surface layer), and another layer may be layered on the opposite side of a surface of the third layer on which the first layer is layered. The third layer is preferably a layer layered on a lamination glass member. A surface of the third layer, which is opposite to the first layer side, is preferably a surface on which the lamination glass member or a glass plate is layered.

The interlayer film according to the present invention should satisfy at least one of the first constitution and the second constitution, may satisfy the first constitution, and may satisfy the second constitution. The interlayer film according to the present invention may satisfy only the first constitution among the first constitution and the second constitution, may satisfy only the second constitution, and may satisfy both the first constitution and the second constitution. From the viewpoint of further enhancing the sound insulating properties, in the above first constitution, the interlayer film preferably satisfies Z≤−0.16Xa−0.2Y+59.

In the interlayer film according to the present invention, an absolute value of a difference between a cloud point measured by using a liquid prepared by dissolving 8 parts by weight of the thermoplastic resin in the first layer in 100 parts by weight of the plasticizer in the first layer and a cloud point measured by using a liquid prepared by dissolving 8 parts by weight of the thermoplastic resin in the third layer in 100 parts by weight of the plasticizer in the third layer is represented by Xb (% by mole), and a content based on parts by weight of the entire plasticizer in the interlayer film relative to 100 parts by weight of the entire thermoplastic resin in the interlayer film is Z (part(s) by weight). The interlayer film according to the present invention preferably satisfies at least one of a third constitution and a fourth constitution.

Third constitution: Xb≤115 (Formula Ab3) and Z≤−0.16Xb+59 (Formula Bb3)

Fourth constitution: the thermoplastic resin in the first layer is a polyvinyl acetal resin, and when an acetylation degree based on a mole percent of the polyvinyl acetal resin in the first layer is represented by Y, Y≥2 (A4) and Z≤−0.16Xb−0.2Y+59 (Bb4)

When the above two formulas (Ab3) and (Bb3) are further satisfied or when the above two formulas (A4) and (Bb4) are satisfied, the sound insulating properties at 30° C. more effectively increase.

The interlayer film according to the present invention preferably satisfies at least one of the first constitution and the third constitution, may satisfy the first constitution, and may satisfy the third constitution. The interlayer film according to the present invention may satisfy only the first constitution among the first constitution and the third constitution, may satisfy only the third constitution, and may satisfy both the first constitution and the third constitution.

The specific effects obtained by satisfying each of the above formulas (Aa1), (A2), (Ab3), (A4), (Ba1), (Ba2), (Bb3), and (Bb4) will be described hereinafter.

The formulas (Aa1) and (Ab3) have an effect on improvement of the transparency of laminated glass and the recycling properties of the interlayer film. In order to obtain an interlayer film, a recovered material (a recovered interlayer film) which has been used at least one time for obtaining an interlayer film may be reused. Examples of the recovered material (a recovered interlayer film) which has been used at least one time for obtaining an interlayer film include unnecessary portions (selvage portions) at both ends of an interlayer film which are generated in a production process of the interlayer film, unnecessary portions (trimmings) at the periphery of an interlayer film which are generated in a production process of laminated glass, an interlayer film for laminated glass obtained by separating and removing glass plates from a defective product of laminated glass generated in the production process of laminated glass, an interlayer film obtained by separating and removing glass plates from laminated glass obtained by disassembling a used vehicle and a decrepit building, and the like. In this connection, an interlayer film which is generated in the production process of the interlayer film and becomes unnecessary also corresponds to a recovered material which has been used at least one time for obtaining an interlayer film. When a haze is low after re-kneading an interlayer film material, the amount of the recovered interlayer film which can be used increases, and the recycling properties can be enhanced. In an interlayer film in which a difference in cloud point between layers whose cloud points are far from each other is approximate, the haze can be reduced when the interlayer film is recovered. In the present invention, the haze after re-kneading can be reduced by controlling the difference in cloud point like (Aa1) and (Ab3), and the recycling properties can be enhanced.

The formulas (A2) and (A4) particularly have an effect on the sound insulating properties. Specifically, since the sound insulating properties are enhanced as the acetylation degree of the polyvinyl acetal resin in the first layer increases, the sound insulating properties can be enhanced by controlling the acetylation degree like (A2) and (A4) in the present invention.

The formulas (Ba1), (Ba2), (Bb3), and (Bb4) particularly have an effect on the sound insulating properties at 30° C. Specifically, the layered laminated glass and the interlayer film are press-bonded under pressure during production of the laminated glass. After press-bonding, the plasticizers in the second and third layers transfer into the first layer having higher affinity for plasticizers. Consequently, a temperature range where the effect of sound insulating properties can be obtained changes to lower temperature. Laminated glass including an interlayer film is often exposed to not only an environment around 20° C. but also an environment around 30° C. In the present invention, the content based on parts by weight of the entire plasticizer in the interlayer film is suitably adjusted, so that the sound insulating properties can be enhanced even at around 30° C. without excessively reducing the temperature range where the effect of the sound insulating properties can be obtained to lower temperature.

From the viewpoint of further improving the sound insulating properties at 30° C., the interlayer film according to the present invention preferably satisfies the following formula (Ca), and preferably satisfies the following formula (Cb).

$$Z \leq -0.16Xa - 0.2Y + 58.5 \quad (Ca)$$

$$Z \leq -0.16Xb - 0.2Y + 58.5 \quad (Cb)$$

From the viewpoint of particularly improving the sound insulating properties at 30° C., the interlayer film according to the present invention preferably satisfies the following formula (Da), and preferably satisfies the following formula (Db).

$$Z \leq -0.16Xa - 0.2Y + 58 \quad (Da)$$

$$Z \leq -0.16Xb - 0.2Y + 58 \quad (Db)$$

From the viewpoint of further improving the sound insulating properties at 20° C., the content of the entire plasticizer in the interlayer film relative to 100 parts by weight of the entire thermoplastic resin in the interlayer film preferably satisfies the following formula (Ea), and preferably satisfies the following formula (Eb)

$$Z \geq -0.16Xa - 0.2Y + 40 \quad (Ea)$$

$$Z \geq -0.16Xa - 0.2Y + 40 \quad (Eb)$$

From the viewpoint of still further improving the sound insulating properties at 20° C., the content of the entire plasticizer in the interlayer film relative to 100 parts by weight of the entire thermoplastic resin in the interlayer film preferably satisfies the following formula (Fa), and preferably satisfies the following formula (Fb).

$$Z \geq -0.16Xa - 0.2Y + 42.5 \quad (Fa)$$

$$Z \geq -0.16Xa - 0.2Y + 42.5 \quad (Fb)$$

From the viewpoint of particularly further improving the sound insulating properties at 20° C., the content of the entire plasticizer in the interlayer film relative to 100 parts by weight of the entire thermoplastic resin in the interlayer film preferably satisfies the following formula (Ga), and preferably satisfies the following formula (Gb).

$$Z \geq -0.16Ha - 0.2Y + 45 \quad (Ga)$$

$$Z \geq -0.16Ha - 0.2Y + 45 \quad (Gb)$$

The content Z based on parts by weight of the entire plasticizer in the interlayer film relative to 100 parts by weight of the entire thermoplastic resin in the interlayer film will be described.

The interlayer film is cut into a size of 0.5 cm in longitudinal length and 5 cm in transversal length, and in the case of a three layer structure having a laminate of the second layer, the first layer, and the third layer, after the interlayer film is left for 12 hours under an environment of 23±2° C. and a humidity of 25±5%, the second layer is peeled from the first layer, and then the third layer is peeled from the first layer. The weight of the peeled first layer is measured using an analytical electronic balance ("GH-200" available from A&D Company, Limited), and the weight of the peeled first layer is defined to be X1 (mg). In the peeled first layer, a content (R1) of a thermoplastic resin which accounts for the total of the thermoplastic resin and a plasticizer in the first layer and a content (P1) of the plasticizer which accounts for the total of the thermoplastic resin and the plasticizer in the first layer are measured using a gas chromatograph ("GC-2014" available from Shimadzu Corp.). The measurement conditions are as follows:

Column: DB-5MS 0.25 mm×30 m, 0.25 μm film thickness
Column temperature: 120° C.–10° C./min.–320° C.
Temperature at injection port: 2500° C.
Detector temperature: 320° C.
Carrier: He 1.1 mL/min.
Injection amount: 1.0 μL
Split ratio: 10:1

The measurement may be carried out as follows. A interlayer film is cut into a size of 0.5 cm in longitudinal length and 5 cm in transversal length. In the case of a three layer structure having a laminate of a second layer, a first layer, and a third layer, after the interlayer film is left for 12 hours under an environment of 23±2° C. and a humidity of 25±5%, the second layer is peeled from the first layer, and then the third layer is peeled from the first layer. For the peeled first layer, a content Q1 based on parts by weight of a plasticizer relative to 100 parts by weight of a thermoplastic resin in the first layer is measured using a gas chromatograph ("GC-2014" available from Shimadzu Corp.). After the interlayer film is left for 12 hours under an environment of 23±2° C. and a humidity of 25±5%, the interlayer film is peeled, and the first layer having a weight of {0.28×(100+Q1)/100} g is sampled. A plasticizer (3.5 g) and {0.35×(100+Q1)/100} g of the sampled first layer are mixed, and a solution in a test tube is heated to 170° C., thus obtaining a solution prepared by dissolving the first layer in the plasticizer. The solution in the test tube is heated to 170° C. to obtain a solution prepared by dissolving a thermoplastic resin in the plasticizer. When the thermoplastic resin is not dissolved even if the solution is heated to 170° C., the solution may be stirred until the thermoplastic resin is dissolved. Afterward, the temperature of the solution is cooled down to −15° C. at a rate of 1° C. per 10 minutes. At that time, the temperature of the solution at which portion of the solution starts to be clouded is visually observed, and this temperature can be taken as a cloud point of the thermoplastic resin of the first layer. The cloud points of the thermoplastic resins contained in the second layer and the third layer also can be measured by the same method as described above.

The above R1 is calculated by dividing the content of the thermoplastic resin in the first layer by the total content of the thermoplastic resin and the plasticizer in the first layer, and the above P1 is calculated by dividing the content of the plasticizer in the first layer by the total content of the thermoplastic resin and the plasticizer in the first layer. Similarly, a weight X2 (mg) of the second layer, a content (R2) of a thermoplastic resin which accounts for the total of the thermoplastic resin and a plasticizer in the second layer, and a content (P2) of the plasticizer which accounts for the total of the thermoplastic resin and the plasticizer in the second layer are measured. Similarly, a weight X3 (mg) of the third layer, a content (R3) of a thermoplastic resin which accounts for the total of the thermoplastic resin and a plasticizer in the third layer, and a content (P3) of the plasticizer which accounts for the total of the thermoplastic resin and the plasticizer in the third layer are measured. In addition, the content of the thermoplastic resin in the first layer is calculated as X1 (mg)×R1, the content of the thermoplastic resin in the second layer is calculated as X2 (mg)×R2, the content of the thermoplastic resin in the third layer is calculated as X3 (mg)×R3, and the content of the thermoplastic resin in the interlayer film is represented by X1 (mg)×R1+X2 (mg)×R2+X3 (mg)×R3. Similarly, the content of the plasticizer in the first layer is calculated as X1 (mg)×P1, the content of the plasticizer in the second layer is calculated as X2 (mg)×P2, the content of the plasticizer in the third layer is calculated as X3 (mg)×P3, and the content of the plasticizer in the interlayer film is represented by X1 (mg)×P1+X2 (mg)×P2+X3 (mg)×P3. From these results, the content Z of the plasticizer in the interlayer film relative to 100 parts by weight of the thermoplastic resin in the interlayer film is calculated from [{X1 (mg)×P1+X2 (mg)×P2+X3 (mg)×P3}/{X1 (mg)×R1+X2 (mg)×R2+X3 (mg)×R3}]×100. When the interlayer film has a multilayer structure including four or more layers, it is preferable that the first layer, the second layer, and the third layer are specified, and the content Z of the plasticizer in the interlayer film relative to 100 parts by weight of the thermoplastic resin in the interlayer film is measured as in the case where the interlayer film has the three layer structure. When at least one of the first layer, the second layer, and the third layer has a colored region and only a portion in a plane direction of the interlayer film has a colored region, it is preferable that, after the interlayer film is cut into a size of 0.5 cm in longitudinal length and 5 cm in transversal length such that the colored region is not included, the content Z of the plasticizer in the interlayer film relative to 100 parts by weight of the thermoplastic resin in the interlayer film is determined.

The content Z may be determined by the following method. Fifteen grams of an interlayer film is sampled. The interlayer film is cut into a size of 3 mm in longitudinal width and 3 mm in transversal width and placed in an aluminum dish ("5-361-02" available from AS ONE Corporation). The interlayer film is dried under vacuum in a vacuum oven at 50° C. for 2 hours. In a room at 23° C., the aluminum dish is placed in a glass desiccator and cooled for 30 minutes, and then the total weight A (g) of the aluminum dish and the interlayer film is measured by a precision balance. The interlayer film is transferred into cylindrical filter paper (ADVANTEC No. 84) from the aluminum dish. The weight B (g) of the empty aluminum dish is measured. A round-bottom flask is placed into an oven and dried at 120° C. for 2 hours. In a room at 23° C., the round-bottom flask is placed in a desiccator and cooled for 30 minutes, and then a total weight C (g) of the round-bottom flask is measured by a precision balance. One hundred fifteen milliliters of diethyl ether is measured and placed into the round-bottom flask. A Soxhlet extractor is attached to the round-bottom flask. The round-bottom flask attached with the Soxhlet extractor is placed into a water bath at a water temperature of 50° C. and refluxed under heating for 10 hours. The round-bottom flask refluxed under heating is placed into an oven to be dried at 120° C. for 2 hours and thus to completely remove diethyl ether. In a room at 23° C., the round-bottom flask is placed in a glass desiccator and cooled for 30 minutes, and then a total weight D (g) of the round-bottom flask and an extraction liquid is measured by a precision balance. From these results, the content Z of the plasticizer in the interlayer film relative to 100 parts by weight of the thermoplastic resin in the interlayer film is calculated from [(D−C)/{(A−B)−(D−C)}×100].

Hereinafter, specific embodiments of the present invention will be described with reference to the drawings.

FIG. 1 is a sectional view schematically showing an interlayer film for laminated glass in accordance with a first embodiment of the present invention.

An interlayer film 11 shown in FIG. 1 is a multi-layered interlayer film having a two or more-layer structure. The interlayer film 11 is used for obtaining laminated glass. The interlayer film 11 is an interlayer film for laminated glass. The interlayer film 11 is provided with a first layer 1, a second layer 2 and a third layer 3. The second layer 2 is arranged on a first surface 1a of the first layer 1 to be layered thereon. The third layer 3 is arranged on a second surface 1b opposite to the first surface 1a of the first layer 1 to be layered thereon. The first layer 1 is an intermediate layer. Each of the second layer 2 and the third layer 3 is a protective layer and is a surface layer in the present embodiment. The first layer 1 is arranged between the second layer 2 and the third layer 3 to be sandwiched therebetween. Accordingly, the interlayer film 11 has a multilayer structure (a second layer 2/a first layer 1/a third layer 3) in which second layer 2, the first layer 1 and the third layer 3 are layered in this order.

Hereinafter, the details of the cloud point and the first layer, the second layer and the third layer which constitute the interlayer film according to the present invention, and the details of each ingredient contained in the first layer, the second layer and the third layer will be described.

(Cloud Point)

A cloud point 1 measured by using a liquid prepared by dissolving 8 parts by weight of the thermoplastic resin in the first layer in 100 parts by weight of the plasticizer in the first layer is preferably lower than a cloud point 2 measured by using a liquid prepared by dissolving 8 parts by weight of the thermoplastic resin in the second layer in 100 parts by weight of the plasticizer in the second layer and the cloud point 3 measured by using a liquid prepared by dissolving 8 parts by weight of the thermoplastic resin in the third layer in 100 parts by weight of the plasticizer in the third layer. When the cloud point 1 is lower than the cloud point 2 and the cloud point 3, the sound insulating properties of laminated glass can be further enhanced.

The cloud point 1 is preferably lower than the cloud point 2 and the cloud point 3 by 50° C. or lower, more preferably 60° C. or lower, still more preferably 70° C. or lower, and especially preferably 80° C. or lower because the sound insulating properties of laminated glass are further enhanced. When only the second constitution is satisfied among the first constitution and the second constitution, an absolute value of a difference between the cloud point 1 and the cloud points 2 and 3 is preferably 160° C. or lower, more preferably 140° C. or lower, and still more preferably 120° C. or lower because the recycling properties of the interlayer film are further enhanced. When either one or both of the first constitution and the second constitution are satisfied, the absolute value of the difference between the cloud point 1 and the cloud points 2 and 3 is preferably 112.5° C. or lower, more preferably 110° C. or lower, still more preferably 107.5° C. or lower, and especially preferably 105° C. or lower.

The cloud point 1 is preferably −25° C. or higher, more preferably −20° C. or higher, even more preferably −15° C. or higher, and especially preferably −10° C. or higher and preferably 40° C. or lower, more preferably 35° C. or lower, and even more preferably 30° C. or lower. When the cloud point 1 is the above lower limit or higher, the rigidity of laminated glass is further enhanced. When the cloud point 1 is the above upper limit or lower, the sound insulating properties of laminated glass are further enhanced.

The cloud point 2 and the cloud point 3 are preferably 100° C. or higher, more preferably 105° C. or higher, even more preferably 110° C. or higher, and especially preferably 115° C. or higher and preferably 190° C. or lower, more preferably 185° C. or lower, and even more preferably 180° C. or lower. When the cloud point 2 and the cloud point 3 are the above lower limit or higher, the rigidity of laminated glass is further enhanced. When the cloud point 1 is the above upper limit or lower, the sound insulating properties of laminated glass are further enhanced.

The above-mentioned cloud point is a cloud point measured in accordance with JIS K 2266 "Testing methods for pour point and cloud point of crude oil and petroleum products". The cloud point measured using the thermoplastic resin and the plasticizer specifically means a temperature obtained as follows: 3.5 g (100 parts by weight) of the plasticizer and 0.28 g (8 parts by weight) of the thermoplastic resin are provided; 3.5 g (100 parts by weight) of the plasticizer and 0.28 g (8 parts by weight) of the thermoplastic resin are mixed in a test tube (diameter: 2 cm) and the thermoplastic resin is dissolved in the plasticizer to prepare a solution; the solution is heated to 170° C., and thereafter, the test tube is left in a −20° C. atmosphere so that the solution is cooled down to −15° C., or the test tube is left in a −196° C. atmosphere so that the solution was cooled down to the pour point temperature of the plasticizer; and the temperature at which part of the solution starts to be clouded is determined (first method for determining a cloud point). The lower the cloud point is, the higher the compatibility between the thermoplastic resin and the plasticizer. In the case where portion of the solution starts to be clouded after the test tube is left in a −20° C. atmosphere so that the solution is cooled down to −15° C., the test tube is left in not a −20° C. atmosphere but a −196° C. atmosphere.

Accordingly, when the cloud point is evaluated, 8 parts by weight of the thermoplastic resin contained in the first layer and 100 parts by weight of the plasticizer contained in the first layer are provided, and then a solution prepared by dissolving 8 parts by weight of the thermoplastic resin in 100 parts by weight of the plasticizer is used.

Examples of the method for measuring the temperature at which portion of the solution starts to be clouded (cloud point) include: a method of visually observing the appearance of the solution; a method of measuring the haze of the solution using a haze meter; and a method of determining the cloudiness in comparison with boundary samples which are prepared in advance with respect to multiple stages of cloudiness. In particular, a method of visually observing the appearance of the solution is preferred. When the haze of the solution is measured by using a haze meter, the temperature at which the haze becomes 10% or more is regarded as the cloud point.

The cloud point measured by using the thermoplastic resin and the plasticizer can be determined whether or not the haze obtained by the following procedure is 10% or more: 3.5 g (100 parts by weight) of the plasticizer and 0.28 g (8 parts by weight) of the thermoplastic resin are provided; 3.5 g (100 parts by weight) of the plasticizer and 0.28 g (8 parts by weight) of the thermoplastic resin are mixed in a test tube (diameter: 2 cm) and the thermoplastic resin is dissolved in the plasticizer to prepare a solution; the solution is heated to 170° C., and the test tube is then left in a thermostatic chamber at a predetermined temperature for one hour; and the haze of the solution in the test tube is measured using a haze meter while the temperature in the thermostatic chamber is maintained (second method for determining a cloud point). For example, the test tube is left in a thermostatic chamber at 5° C., 0° C., and −5° C. for one hour, and then the haze of the solution in the test tube is measured using a haze meter while the temperature in the thermostatic chamber is maintained, so that the temperature at which the haze is 10% or more may be measured.

In the present invention, the cloud point may be determined by the first method for determining a cloud point or may be determined by the second method for determining a cloud point. Although it is preferable to determine the cloud point by the first method for determining a cloud point, the second method for determining a cloud point may be applied for the purpose of more precisely identifying the cloud point.

When the thermoplastic resin is dissolved in the plasticizer by the first or second determination method, in the case where the dissolution temperature is changed from 170° C. to 200° C. in order to sufficiently dissolve the thermoplastic resin in the plasticizer or the resulting solution is stirred until the thermoplastic resin is dissolved in the plasticizer, the same tendency can be obtained.

With regard to the thermoplastic resin used for the method for determining a cloud point, the thermoplastic resin used for production of the interlayer film may be used, or the thermoplastic resin contained in a layer of the interlayer film may be taken out and used.

(Thermoplastic Resin)

The first layer contains a thermoplastic resin (hereinafter, sometimes described as a thermoplastic resin (1)). The first layer preferably contains a polyvinyl acetal resin (hereinafter, sometimes described as a polyvinyl acetal resin (1)) as the thermoplastic resin (1). The second layer contains a thermoplastic resin (hereinafter, sometimes described as a thermoplastic resin (2)). The second layer preferably contains a polyvinyl acetal resin (hereinafter, sometimes described as a polyvinyl acetal resin (2)) as the thermoplastic resin (2). The third layer preferably contains a thermoplastic resin (hereinafter, sometimes described as a thermoplastic resin (3)). The third layer preferably contains a polyvinyl acetal resin (hereinafter, sometimes described as a polyvinyl acetal resin (3)) as the thermoplastic resin (3). Although the thermoplastic resin (1), the thermoplastic resin (2), and the thermoplastic resin (3) may be the same as or different from one another, it is preferred that the thermoplastic resin (1) be different from the thermoplastic resin (2) and the thermoplastic resin (3) because the sound insulating properties are further enhanced. Although the polyvinyl acetal resin (1), the polyvinyl acetal resin (2), and the polyvinyl acetal resin (3) may be the same as or different from one another, it is preferred that the polyvinyl acetal resin (1) be different from the polyvinyl acetal resin (2) and the polyvinyl acetal resin (3) because the sound insulating properties are further enhanced. One kind of each of the thermoplastic resin (1), the thermoplastic resin (2) and the thermoplastic resin (3) may be used alone, and two or more kinds thereof may be used in combination. One kind of each of the polyvinyl acetal resin (1), the polyvinyl acetal resin (2) and the polyvinyl acetal resin (3) may be used alone, and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

For example, the polyvinyl acetal resin can be produced by acetalizing polyvinyl alcohol with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally falls within the range of 70 to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, and most preferably 2700 or more and preferably 5000 or less, more preferably 4000 or less, and even more preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

It is preferred that the number of carbon atoms of the acetal group in the polyvinyl acetal resin lie within the range of 3 to 5, and it is preferred that the number of carbon atoms of the acetal group be 4 or 5.

In general, as the aldehyde, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, benzaldehyde, and the like. Acetaldehyde, propionaldehyde, n-butyraldehyde, isobutyraldehyde, n-hexylaldehyde or n-valeraldehyde is preferred, acetaldehyde, propionaldehyde, n-butyraldehyde, isobutyraldehyde or n-valeraldehyde is more preferred, and n-butyraldehyde or n-valeraldehyde is further preferred. One kind of the aldehyde may be used alone, and two or more kinds thereof may be used in combination.

The content of the hydroxyl group (the amount of hydroxyl groups) of the polyvinyl acetal resin (1) is preferably 17% by mole or more, more preferably 20% by mole or more, and even more preferably 22% by mole or more and preferably 28% by mole or less, more preferably 27% by mole or less, even more preferably 25% by mole or less, and especially preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, and moreover, when being 28% by mole or less, the sound insulating properties of laminated glass are further enhanced. Moreover, when the content of the hydroxyl group is the above upper limit or less, the flexibility of the interlayer film is enhanced and the handling of the interlayer film is facilitated.

The content of the hydroxyl group of each of the polyvinyl acetal resin (2) and the polyvinyl acetal resin (3) is preferably 25% by mole or more, more preferably 28% by mole or more, more preferably 30% by mole or more, even more preferably 31.5% by mole or more, even more preferably 32% by mole or more, and especially preferably 33% by mole or more and preferably 40% by mole or less, more preferably 38% by mole or less, even more preferably 37% by mole or less, and especially preferably 36% by mole or less. When the content of the hydroxyl group is the above lower limit or more, the flexural rigidity is further enhanced, and the adhesive force of the interlayer film is further enhanced. Moreover, when the content of the hydroxyl group is the above upper limit or less, the flexibility of the interlayer film is enhanced and the handling of the interlayer film is facilitated.

From the viewpoint of further enhancing the sound insulating properties, it is preferred that the content of the hydroxyl group of the polyvinyl acetal resin (1) be lower than the content of the hydroxyl group of the polyvinyl acetal resin (2). From the viewpoint of further enhancing the sound insulating properties, it is preferred that the content of the hydroxyl group of the polyvinyl acetal resin (1) be lower than the content of the hydroxyl group of the polyvinyl acetal resin (3). From the viewpoint of still further enhancing the sound insulating properties, the absolute value of a difference between the content of the hydroxyl group of the polyvinyl acetal resin (1) and the content of the hydroxyl group of the polyvinyl acetal resin (2) and the absolute value of a difference between the content of the hydroxyl group of the polyvinyl acetal resin (1) and the content of the hydroxyl group of the polyvinyl acetal resin (3) are preferably 1% by mole or more, more preferably 2% by mole or more, even more preferably 3% by mole or more, especially preferably 4% by mole or more, and most preferably 5% by mole or more. From the viewpoint of still further enhancing the sound insulating properties, each of the absolute value of the difference between the content of the hydroxyl group of the polyvinyl acetal resin (1) and the content of the hydroxyl group of the polyvinyl acetal resin (2) and the absolute value of the difference between the content of the hydroxyl group of the polyvinyl acetal resin (1) and the content of the hydroxyl group of the polyvinyl acetal resin (3) is preferably 20% by mole or less, more preferably 15% by mole or less, even more preferably 11.5% by mole or less, further preferably 11% by mole or less, still further preferably 10% by mole or less, especially preferably 9.5% by mole or less, and most preferably 8.5% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

When only the first constitution is satisfied among the first constitution and the second constitution, the acetylation degree (amount of acetyl groups) of the polyvinyl acetal resin (1) is preferably 0.01% by mole or more, and more preferably 0.1% by mole or more, and when either one or both of the first constitution and the second constitution are satisfied, the acetylation degree is preferably 3% by mole or more, more preferably 5% by mole or more, even more preferably 7% by mole or more, and further preferably 9% by mole or more and is preferably 30% by mole or less, more preferably 25% by mole or less, even more preferably 24% by mole or less, especially preferably less than 24% by mole, and most preferably 20% by mole or less. When the acetylation degree is the above lower limit or more, the compatibility between the polyvinyl acetal resin and the plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is excellent in penetration resistance.

The acetylation degree of each of the polyvinyl acetal resin (2) and the polyvinyl acetal resin (3) is preferably 0.01% by mole or more, and more preferably 0.5% by mole or more and is preferably 10% by mole or less, and more preferably 2% by mole or less. When the acetylation degree is the above lower limit or more, the compatibility between the polyvinyl acetal resin and the plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree of the polyvinyl acetal resin (1) (the butyralization degree in the case of a polyvinyl butyral resin) is preferably 47% by mole or more, and more preferably 60% by mole or more and is preferably 85% by mole or less, more preferably 80% by mole or less, and even more preferably 75% by mole or less. When the acetalization degree is the above lower limit or more, the compatibility between the polyvinyl acetal resin and the plasticizer is enhanced. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more, and more preferably 60% by mole or more and is preferably 75% by mole or less, and more preferably 71% by mole or less. When the acetalization degree is the above lower limit or more, the compatibility between the polyvinyl acetal resin and the plasticizer is enhanced. When the acetalization degree is the above upper limit or less, the reaction time required for producing the polyvinyl acetal resin is shortened.

The acetalization degree is a mole fraction, represented in percentage, obtained by dividing a value obtained by subtracting the amount of ethylene groups to which the hydroxyl group is bonded and the amount of ethylene groups to which the acetyl group is bonded from the total amount of ethylene groups in the main chain by the total amount of ethylene groups in the main chain.

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

From the viewpoint of further improving the penetration resistance of laminated glass, it is preferred that the polyvinyl acetal resin (1) be a polyvinyl acetal resin (A) with an acetylation degree (a) of less than 8% by mole and an acetalization degree (a) of 65% by mole or more or a polyvinyl acetal resin (B) with an acetylation degree (b) of 8% by mole or more. Each of the polyvinyl acetal resin (2) and the polyvinyl acetal resin (3) may be the polyvinyl acetal resin (A) and may be the polyvinyl acetal resin (B).

The acetylation degree (a) of the polyvinyl acetal resin (A) is less than 8% by mole, preferably 7.9% by mole or less, more preferably 7.8% by mole or less, even more preferably 6.5% by mole or less, and especially preferably 6% by mole or less and preferably 0.1% by mole or more, more preferably 0.5% by mole or more, even more preferably 2% by mole or more, especially preferably 5% by mole or more, and most preferably 5.5% by mole or more. When the acetylation degree (a) is 0.1% by mole or more and less than 8% by mole, the transfer of the plasticizer can be easily controlled and the sound insulating properties of laminated glass are further enhanced.

The acetalization degree (a) of the polyvinyl acetal resin (A) is 65% by mole or more, preferably 66% by mole or more, more preferably 67% by mole or more, even more preferably 67.5% by mole or more, and especially preferably 75% by mole or more and preferably 85% by mole or less, more preferably 84% by mole or less, even more preferably 83% by mole or less, and especially preferably 82% by mole or less. When the acetalization degree (a) is the above lower limit or more, the sound insulating properties of laminated glass are further enhanced. When the acetalization degree (a) is the above upper limit or less, the reaction time required for producing the polyvinyl acetal resin (A) can be shortened.

The content (a) of the hydroxyl group of the polyvinyl acetal resin (A) is preferably 18% by mole or more, more preferably 19% by mole or more, even more preferably 20% by mole or more, especially preferably 21% by mole or more, and most preferably 23% by mole or more and preferably 31% by mole or less, more preferably 30% by mole or less, even more preferably 29% by mole or less, and especially preferably 28% by mole or less. When the content (a) of the hydroxyl group is the above lower limit or more, the adhesive force of the second layer is further enhanced. When the content (a) of the hydroxyl group is the above upper limit or less, the sound insulating properties of laminated glass are further enhanced.

The acetylation degree (b) of the polyvinyl acetal resin (B) is 8% by mole or more, preferably 9% by mole or more, more preferably 9.5% by mole or more, even more preferably 10% by mole or more, and especially preferably 10.5% by mole or more and preferably 30% by mole or less, more preferably 28% by mole or less, even more preferably 26% by mole or less, and especially preferably 24% by mole or less. When the acetylation degree (b) is the above lower limit or more, the sound insulating properties of laminated glass are further enhanced. When the acetylation degree (b) is the above upper limit or less, the reaction time required for producing the polyvinyl acetal resin (B) can be shortened.

The acetalization degree (b) of the polyvinyl acetal resin (B) is preferably 50% by mole or more, more preferably 53% by mole or more, even more preferably 55% by mole or more, and especially preferably 60% by mole or more and preferably 78% by mole or less, more preferably 75% by mole or less, even more preferably 72% by mole or less, and especially preferably 70% by mole or less. When the acetalization degree (b) is the above lower limit or more, the sound insulating properties of laminated glass are further enhanced. When the acetalization degree (b) is the above upper limit or less, the reaction time required for producing the polyvinyl acetal resin (B) can be shortened.

The content (b) of the hydroxyl group of the polyvinyl acetal resin (B) is preferably 18% by mole or more, more preferably 19% by mole or more, even more preferably 20% by mole or more, especially preferably 21% by mole or more, and most preferably 23% by mole or more and preferably 31% by mole or less, more preferably 30% by mole or less, even more preferably 29% by mole or less, and especially preferably 28% by mole or less. When the content (b) of the hydroxyl group is the above lower limit or more, the adhesive force of the second layer is further enhanced. When the content (b) of the hydroxyl group is the above upper limit or less, the sound insulating properties of laminated glass are further enhanced.

Each of the polyvinyl acetal resin (1), the polyvinyl acetal resin (2), the polyvinyl acetal resin (3), the polyvinyl acetal resin (A), and the polyvinyl acetal resin (B) is preferably a polyvinyl butyral resin.

(Plasticizer)

The first layer (including a single-layered interlayer film) contains a plasticizer (hereinafter, sometimes described as a plasticizer (1)). The second layer contains a plasticizer (hereinafter, sometimes described as a plasticizer (2)). It is preferred that the third layer contain a plasticizer (hereinafter, sometimes described as a plasticizer (3)). By the use of the plasticizer or by the use of the polyvinyl acetal resin and the plasticizer in combination, the adhesive force of a layer containing the polyvinyl acetal resin and the plasticizer to a lamination glass member or another layer is moderately enhanced. The plasticizer is not particularly limited. The plasticizer (1), the plasticizer (2) and the plasticizer (3) may be the same as or different from one another. One kind of each of the plasticizer (1), the plasticizer (2) and the plasticizer (3) may be used alone, and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms, and the like. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

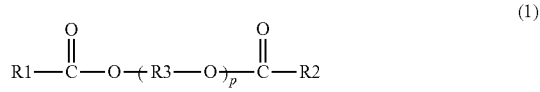

In the foregoing formula (1), R1 and R2 each represent an organic group with 2 to 10 carbon atoms, R3 represents an ethylene group, an isopropylene group or an n-propylene group, and p represents an integer of 3 to 10.

It is preferred that R1 and R2 in the foregoing formula (1) each be an organic group with 5 to 10 carbon atoms, and it is more preferred that R1 and R2 each be an organic group with 6 to 10 carbon atoms.

The above-mentioned plasticizer preferably includes di-(2-butoxyethyl)-adipate (DBEA), triethylene glycol di-2-ethylhexanoate (3GO), triethylene glycol di-2-ethylbutyrate (3GH), or triethylene glycol di-2-ethylpropanoate, more preferably includes triethylene glycol di-2-ethylhexanoate (3GO), triethylene glycol di-2-ethylbutyrate (3GH), or triethylene glycol di-2-ethylpropanoate, still more preferably includes triethylene glycol di-2-ethylhexanoate or triethylene glycol di-2-ethylbutyrate, and especially preferably includes triethylene glycol di-2-ethylhexanoate.

Each of the content of the plasticizer (2) (hereinafter, sometimes described as the content (2)) relative to 100 parts by weight of the thermoplastic resin (2) and the content of the plasticizer (3) (hereinafter, sometimes described as the content (3)) relative to 100 parts by weight of the thermoplastic resin (3) is preferably 10 parts by weight or more, more preferably 15 parts by weight or more, further preferably 20 parts by weight or more, especially preferably 24 parts by weight or more, and especially preferably more than 25 parts by weight and preferably 50 parts by weight or less, more preferably 45 parts by weight or less, even more preferably 40 parts by weight or less, further preferably 35 parts by weight or less, especially preferably 32 parts by weight or less, and most preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the flexural rigidity is further enhanced. Even when the content (2) and the content (3) are the above lower limit or more, as long as the two formulas (Aa1) and (Ba1) are satisfied or the two formulas (A2) and (Ba2) are satisfied, the sound insulating properties around 30° C. can be enhanced.

The content of the plasticizer (1) (hereinafter, sometimes described as the content (1)) relative to 100 parts by weight of the thermoplastic resin (1) is preferably 40 parts by weight or more, more preferably 45 parts by weight or more, even more preferably 50 parts by weight or more, further preferably 55 parts by weight or more, and especially preferably 60 parts by weight or more and preferably 100 parts by weight or less, more preferably 90 parts by weight or less, further preferably 85 parts by weight or less, and especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced. Even when the content (2) and the content (3) are the above lower limit or more, as long as the two formulas (Aa1) and (Ba1) are satisfied or the two formulas (A2) and (Ba2) are satisfied, the sound insulating properties around 30° C. can be enhanced.

For the purpose of enhancing the sound insulating properties of laminated glass, it is preferred that the content (1) be larger than the content (2) and it is preferred that the content (1) be larger than the content (3).

From the viewpoint of further enhancing the sound insulating properties of laminated glass, each of the absolute value of the difference between the content (2) and the content (1) and the absolute value of the difference between the content (3) and the content (1) is preferably 10 parts by weight or more, more preferably 15 parts by weight or more, and even more preferably 20 parts by weight or more. Each of the absolute value of the difference between the content (2) and the content (1) and the absolute value of the difference between the content (3) and the content (1) is preferably 80 parts by weight or less, more preferably 75 parts by weight or less, and even more preferably 70 parts by weight or less.

(Heat Shielding Compound)

It is preferred that the interlayer film include a heat shielding compound. It is preferred that the first layer contain a heat shielding compound. It is preferred that the second layer contain a heat shielding compound. It is preferred that the third layer contain a heat shielding compound. One kind of the heat shielding compound may be used alone, and two or more kinds thereof may be used in combination.

It is preferred that the heat shielding compound be constituted of at least one kind of Ingredient X among a phthalocyanine compound, a naphthalocyanine compound, and an anthracyanine compound or be constituted of heat shielding particles. In that case, the heat shielding compound may be constituted of both of the Ingredient X and the heat shielding particles.

Ingredient X:

It is preferred that the interlayer film include at least one kind of Ingredient X among a phthalocyanine compound, a naphthalocyanine compound and an anthracyanine compound. It is preferred that the first layer contain the Ingredient X. It is preferred that the second layer contain the Ingredient X. It is preferred that the third layer contain the Ingredient X. The Ingredient X is a heat shielding compound. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of a layer containing the Ingredient X (a first layer, a second layer or a third layer), the content of the Ingredient X is preferably 0.001% by weight or more, more preferably 0.005% by weight or more, further preferably 0.01% by weight or more, and especially preferably 0.02% by weight or more and preferably 0.2% by weight or less, more preferably 0.1% by weight or less, further preferably 0.05% by weight or less, and especially preferably 0.04% by weight or less. When the content of the Ingredient X is the above lower limit or more and the above upper limit or less, the heat shielding properties are sufficiently enhanced and the visible light transmittance is sufficiently enhanced. For example, it is possible to make the visible light transmittance 70% or more.

Heat Shielding Particles:

It is preferred that the interlayer film include heat shielding particles. It is preferred that the first layer contain the heat shielding particles. It is preferred that the second layer contain the heat shielding particles. It is preferred that the third layer contain the heat shielding particles. The heat shielding particle is of a heat shielding compound. By the use of heat shielding particles, infrared rays (heat rays) can be effectively cut off. One kind of the heat shielding particles may be used alone, and two or more kinds thereof may be used in combination.

From the viewpoint of further enhancing the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, and more preferably 0.02 μm or more and preferably 0.1 μm or less, and more preferably 0.05 μm or less. When the average particle diameter is the above lower limit or more, the heat ray shielding properties are sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of a layer containing the heat shielding particles (a first layer, a second layer or a third layer), each content of the heat shielding particles is preferably 0.01% by weight or more, more preferably 0.1% by weight or more, further preferably 1% by weight or more, and especially preferably 1.5% by weight or more and preferably 6% by weight or less, more preferably 5.5% by weight or less, further preferably 4% by weight or less, especially preferably 3.5% by weight or less, and most preferably 3% by weight or less. When the content of the heat shielding particles is the above lower limit or more and the above upper limit or less, the heat shielding properties are sufficiently enhanced and the visible light transmittance is sufficiently enhanced.

(Metal Salt)

It is preferred that the interlayer film contain at least one kind of metal salt (hereinafter, sometimes described as Metal salt M) among an alkali metal salt, an alkaline earth metal salt, and a magnesium salt. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a lamination glass member or the adhesivity between respective layers in the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt included in the interlayer film contain at least one kind of metal among K and Mg.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Although the magnesium carboxylate with 2 to 16 carbon atoms and the potassium carboxylate with 2 to 16 carbon atoms are not particularly limited, examples thereof include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in a layer containing the Metal salt M (a first layer, a second layer or a third layer) is preferably 5 ppm or more, more preferably 10 ppm or more, and further preferably 20 ppm or more and preferably 300 ppm or less, more preferably 250 ppm or less, and further preferably 200 ppm or less. When the total of the contents of Mg and K is the above lower limit or more and the above upper limit or less, the adhesivity between the interlayer film and a lamination glass member or the adhesivity between respective layers in the interlayer film can be further well controlled.

(Ultraviolet Ray Screening Agent)

It is preferred that the interlayer film include an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and laminated glass are used for a long period of time, the visible light transmittance becomes further difficult to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure, an ultraviolet ray screening agent having a benzophenone structure, an ultraviolet ray screening agent having a triazine structure, an ultraviolet ray screening agent having a malonic acid ester structure, an ultraviolet ray screening agent having an oxanilide structure, an ultraviolet ray screening agent having a benzoate structure, and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure or an ultraviolet ray screening agent having a benzoate structure, more preferably an ultraviolet ray screening agent having a benzotriazole structure or an ultraviolet ray screening agent having a benzophenone structure, and further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material.

Examples of the coating material for the surface of the ultraviolet ray screening agent containing a metal oxide include an insulating metal oxide, a hydrolyzable organosilicon compound, a silicone compound, and the like.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray absorbing performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

From the viewpoint of further suppressing the lowering in visible light transmittance after the lapse of a certain period of time, in 100% by weight of a layer containing the ultraviolet ray screening agent (a first layer, a second layer or a third layer), the content of the ultraviolet ray screening agent is preferably 0.1% by weight or more, more preferably 0.2% by weight or more, further preferably 0.3% by weight or more, especially preferably 0.5% by weight or more, preferably 2.5% by weight or less, more preferably 2% by weight or less, further preferably 1% by weight or less, and especially preferably 0.8% by weight or less. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film include an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris- (2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1l-phenyloxy) (2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "IRGANOX 1010" available from BASF Japan Ltd., and the like.

With regard to the interlayer film and laminated glass, in order to maintain high visible light transmittance thereof over a long period of time, it is preferred that the content of the oxidation inhibitor be 0.1% by weight or more in 100% by weight of the interlayer film or in 100% by weight of the layer containing the oxidation inhibitor (a first layer, a second layer or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the interlayer film, the first layer, the second layer and the third layer may contain additives such as a coupling agent, a dispersing agent, a surfactant, a flame retardant, an antistatic agent, a pigment, a dye, an adhesive force regulating agent other than a metal salt, a moisture-resistance improving agent, a fluorescent brightening agent and an infrared ray absorber, as necessary. One kind of these additives may be used alone, and two or more kinds thereof may be used in combination.

(Other Details of Interlayer Film for Laminated Glass)

From the viewpoint of further enhancing the sound insulating properties of laminated glass, the glass transition temperature of the first layer is preferably 15° C. or lower, more preferably 10° C. or lower, further preferably 5° C. or lower, and especially preferably 0° C. or lower. The glass transition temperature of the first layer is preferably –20° C. or higher.

The distance between one end and the other end of the interlayer film is preferably 0.5 m or more, more preferably 0.8 m or more, and especially preferably 1 m or more and preferably 3 m or less, more preferably 2 m or less, and especially preferably 1.5 m or less. When the interlayer film has a length direction and a width direction, the distance between one end and the other end is a distance in the length direction of the interlayer film. When the interlayer film has a square planar shape, the distance between one end and the other end is a distance between one end and the other end facing each other.

The thickness of the interlayer film is not particularly limited. From the viewpoint of the practical aspect and the viewpoint of sufficiently enhancing the penetration resistance and the flexural rigidity of laminated glass, the thickness of the interlayer film is preferably 0.1 mm or more, and more preferably 0.25 mm or more and preferably 3 mm or less, more preferably 2 mm or less, and further preferably 1.5 mm or less. When the thickness of the interlayer film is the above lower limit or more, the penetration resistance and the flexural rigidity of laminated glass are enhanced. When the thickness of the interlayer film is the above upper limit or less, the transparency of the interlayer film is further improved.

The thickness of the interlayer film is represented by T. The thickness of the first layer is preferably 0.0625 T or more, and more preferably 0.1 T or more and preferably 0.4 T or less, more preferably 0.375 T or less, further preferably 0.25 T or less, and further preferably 0.15 T or less. When the thickness of the above-mentioned first layer is 0.4 T or less, the flexural rigidity is further improved.

The thickness of each of the above-mentioned second and third layers is preferably 0.3 T or more, more preferably 0.3125 T or more, and further preferably 0.375 T or more and preferably 0.9375 T or less, and more preferably 0.9 T or less. The thickness of each of the second and third layers may be 0.46875 T or less or 0.45 T or less. When the thickness of each of the second and third layers is the above lower limit or more and the above upper limit or less, the rigidity and the sound insulating properties of laminated glass are further enhanced.

The total thickness of the second and third layers is preferably 0.625 T or more, more preferably 0.75 T or more, and further preferably 0.85 T or more and preferably 0.9375 T or less, and more preferably 0.9 T or less. When the total thickness of the second and third layers is the above lower limit or more and the above upper limit or less, the rigidity and the sound insulating properties of laminated glass are further enhanced.

The interlayer film may be an interlayer film having a uniform thickness or an interlayer film having a changing thickness. The sectional shape of the interlayer film may be a rectangular shape or may be a wedge-like shape.

The production method of the interlayer film according to the present invention is not particularly limited. In the case of a single-layered interlayer film, examples of the production method of the interlayer film according to the present invention include a method of extruding a resin composition with an extruder. In the case of a multi-layered interlayer film, examples of the production method of the interlayer film according to the present invention include a method of separately forming respective resin compositions used for constituting respective layers into respective layers, and then, for example, layering the respective obtained layers, a method of coextruding respective resin compositions used for constituting respective layers with an extruder and layering the respective layers, and the like. A production method of extrusion-molding is preferred because the method is suitable for continuous production.

Since the production efficiency of the interlayer film is excellent, it is preferred that respective thermoplastic resins contained in the second layer and the third layer be the same as each other, it is more preferred that respective thermoplastic resins contained in the second layer and the third layer be the same as each other and respective plasticizers contained therein be the same as each other, and it is further preferred that the second layer and the third layer be formed from the same resin composition as each other.

It is preferred that the interlayer film have recesses and protrusions on at least one of both surfaces thereof. It is preferred that the interlayer film have recesses and protrusions on both surfaces thereof. Examples of the method for forming recesses and protrusions include, but are not particularly limited to, a lip embossing method, an embossing roll method, a calendar roll method, a profile extrusion method, and the like. Among these, an embossing roll method is preferred because this method makes it possible to form a large number of recesses and protrusions that are quantitatively constant recess and protrusion patterns.

(Laminated Glass)

FIG. 2 is a sectional view schematically showing an example of laminated glass prepared with the interlayer film for laminated glass shown in FIG. 1.

Laminated glass 31 shown in FIG. 2 is provided with a first lamination glass member 21, a second lamination glass member 22 and an interlayer film 11. The interlayer film 11 is arranged between the first lamination glass member 21 and the second lamination glass member 22 to be sandwiched therebetween.

The first lamination glass member 21 is layered on a first surface 11a of the interlayer film 11. The second lamination glass member 22 is layered on a second surface 11b opposite to the first surface 11a of the interlayer film 11. The first lamination glass member 21 is layered on an outer surface 2a of the second layer 2. The second lamination glass member 22 is layered on an outer surface 3a of the third layer 3.

As described above, the laminated glass according to the present invention is provided with a first lamination glass member, a second lamination glass member, and an interlayer film, and the interlayer film is the interlayer film for laminated glass according to the present invention. In the laminated glass according to the present invention, the above-mentioned interlayer film is arranged between the first lamination glass member and the second lamination glass member.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thickness of the lamination glass member is preferably 1 mm or more and preferably 5 mm or less, and more preferably 3 mm or less. Moreover, when the lamination glass member is a glass plate, the thickness of the glass plate is preferably 0.5 mm or more, and more preferably 0.7 mm or more and preferably 5 mm or less, and more preferably 3 mm or less. When the lamination glass member is a PET film, the thickness of the PET film is preferably 0.03 mm or more and preferably 0.5 mm or less.

The use of the interlayer film according to the present invention makes it possible to maintain the flexural rigidity of the laminated glass at a high level even if the laminated glass has a small thickness. From the viewpoint of lightening the laminated glass, reducing an environmental load by reducing the amount of materials of the laminated glass, or reducing an environmental load by improving fuel efficiency of an automobile by means of lightening the laminated glass, the thickness of the above-mentioned glass plate is preferably 2 mm or less, more preferably 1.8 mm or less, even more preferably 1.5 mm or less, further preferably 1 mm or less, still further preferably 0.8 mm or less, and especially preferably 0.7 mm or less.

The method for producing the laminated glass is not particularly limited. For example, the interlayer film is sandwiched between the first lamination glass member and the second lamination glass member, and then, passed through pressure rolls or subjected to decompression suction in a rubber bag, so that the air remaining between the first and the second lamination glass members and the interlayer film is removed. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained. At the time of producing the laminated glass, a first layer, a second layer and a third layer may be layered.

Each of the interlayer film and the laminated glass can be used for automobiles, railway vehicles, aircraft, ships, buildings and the like. Each of the interlayer film and the laminated glass can also be used for applications other than these applications. It is preferred that the interlayer film and the laminated glass be an interlayer film and laminated glass for vehicles or for building respectively, and it is more preferred that the interlayer film and the laminated glass be an interlayer film and laminated glass for vehicles respectively. Each of the interlayer film and the laminated glass can be used for a windshield, side glass, rear glass or roof glass of an automobile, and the like. The interlayer film and the laminated glass are suitably used for automobiles. The interlayer film is used for obtaining laminated glass of an automobile.

From the viewpoint of obtaining laminated glass further excellent in transparency, the visible light transmittance of laminated glass is preferably 65% or more and more preferably 70% or more. The visible light transmittance of laminated glass can be measured in accordance with JIS R3211 (1998). It is preferred that the visible light transmittance of laminated glass obtained by sandwiching the interlayer film for laminated glass according to the present invention between two sheets of green glass (heat ray-absorbing plate glass) with a thickness of 2 mm in accordance with JIS R3208 be 70% or more. The visible light transmittance is more preferably 75% or more.

Hereinafter, the present invention will be described in more detail with reference to examples. The present invention is not limited only to these examples.

The following materials were provided.

(Thermoplastic Resin)

Polyvinyl acetal resins shown in the following Table 1 were used. In all polyvinyl acetal resins used, n-butyraldehyde which has 4 carbon atoms is used for the acetalization. With regard to the polyvinyl acetal resin, the acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

(Plasticizer)

Triethylene glycol di-2-ethylhexanoate (3GO)

(Ultraviolet Ray Screening Agent)

Tinuvin 326 (2-(2'-hydroxy-3'-t-butyl-5-methylphenyl)-5-chlorobenzotriazole, "Tinuvin 326" available from BASF Japan Ltd.)

(Oxidation Inhibitor)

BHT (2,6-di-t-butyl-p-cresol)

Example 1

Preparation of Composition for Forming First Layer:

One hundred parts by weight of a polyvinyl acetal resin of a kind shown in the following Tables 1 and 2, 60 parts by weight of a plasticizer (3GO), 0.2 parts by weight of an ultraviolet ray screening agent (Tinuvin 326) and 0.2 parts by weight of an oxidation inhibitor (BHT) were mixed to obtain a composition for forming a first layer.

Preparation of Composition for Forming Second Layer and Third Layer:

One hundred parts by weight of a polyvinyl acetal resin of a kind shown in the following Table 1, 35 parts by weight of a plasticizer (3GO), 0.2 parts by weight of an ultraviolet ray screening agent (Tinuvin 326) and 0.2 parts by weight of an oxidation inhibitor (BHT) were mixed to obtain a composition for forming a second layer and a third layer.

Preparation of Interlayer Film:

By coextruding the composition for forming a first layer and the composition for forming a second layer and a third layer using a coextruder, an interlayer film (780 μm in thickness) having a layered structure with a stack of a second layer (340 μm in thickness)/a first layer (100 μm in thickness)/a third layer (340 μm in thickness) was prepared.

Preparation of Laminated Glass a (for Measuring Sound Insulating Properties):

The obtained interlayer film was cut into a size of 30 cm in longitudinal length×2.5 cm in transversal length. Next, the interlayer film was sandwiched between two sheets of green glass (30 cm in longitudinal length×2.5 cm in transversal length×2 mm in thickness) in accordance with JIS R3208 to obtain a laminate. The laminate was put into a rubber bag and the inside thereof was degassed for 20 minutes at a degree of vacuum of 2.6 kPa, after which the laminate was transferred into an oven while keeping the laminate degassed, and furthermore, held in place at 90° C. for 30 minutes and pressed under vacuum to subject the laminate to preliminary press-bonding. The preliminarily press-bonded laminate was subjected to press-bonding for 20 minutes under conditions of 135° C. and a pressure of 1.2 MPa in an autoclave to obtain a sheet of laminated glass A.

Examples 2 to 23 and Comparative Example 1

Interlayer films and laminated glasses were obtained in the same manner as in Example 1, except that the kind and blending amount of the polyvinyl acetal resin and plasticizer used in the composition for forming the first layer and the composition for forming the second and third layers were set as shown in the following Tables 1 and 2, and the thickness of each of the first layer, the second layer, and the third layer was set as shown in the following Tables 1 and 2. Furthermore, in Examples 2 to 23 and Comparative Example 1, the same kind of ultraviolet ray screening agent and oxidation inhibitor as those in Example 1 were blended in the same blending amount (0.2 parts by weight relative to 100 parts by weight of the polyvinyl acetal resin) as in Example 1.

(Evaluation)

(1) (Cloud Point)

Prepared were 3.5 g (100 parts by weight) of the plasticizer used in the first layer of each of examples and comparative example and 0.28 g (8 parts by weight) of the polyvinyl acetal resin used in the first layer in each of examples and comparative example. In a test tube ("(W/O Rim)P-18M" available from Nichiden-Rika Glass Co., Ltd., diameter: 1.8 cm) were mixed 3.5 g (100 parts by weight) of the first plasticizer and 0.28 g (8 parts by weight) of the polyvinyl acetal resin, and the resulting solution in the test tube was heated to 170° C., thus obtaining a solution prepared by dissolving the polyvinyl acetal resin in the first plasticizer. In the case where the polyvinyl acetal resin was not dissolved even when the solution was heated to 170° C., the solution was stirred until the polyvinyl acetal resin was dissolved. Afterward, the temperature of the solution was cooled down to −15° C. at a rate of 1° C. per 10 minutes. At that time, the temperature of the solution at which portion of the solution started to be clouded was visually observed, and the temperature was defined as a cloud point 1. Similarly, a cloud point 2 and a cloud point 3 were measured using the plasticizer used in the second layer and the third layer of each of examples and comparative example and the polyvinyl acetal resin used in the second layer and the third layer of each of examples and comparative example. A specific measurement method is as described above. When the cloud point was lower than 150° C., even if the solution in the test tube was heated to 150° C. and the operation as described above was performed, a similar cloud point was obtained.

(2) Change in Sound Insulating Properties at 30° C.

The obtained laminated glass was stored for 24 hours under an environment of 23° C. The laminated glass stored for 24 hours was stored for one hour in a thermostatic chamber at 30° C., and then the mechanical impedance in the thermostatic chamber at 30° C. was measured by the central exciting method in accordance with ISO 16940:2008. A loss factor $\eta a$ in the primary mode after 24 hours was calculated from the obtained transfer function by the half band width method. In addition, a loss factor $\eta b$ in the primary mode after 12 weeks was calculated in the same manner as described above, except that the obtained laminated glass was stored for 12 weeks under an environment of 23° C.

A rate of change in the sound insulating properties at 30° C. was calculated from the loss factor $\eta a$ in the primary mode after 24 hours and the loss factor $\eta b$ in the primary mode after 12 weeks as in the following formula.

Rate of change in sound insulating properties at 30° C.$=(\eta b - \eta a)/\eta a \times 100$ (3) Sound Insulating Properties at 20° C.

The obtained laminated glass was stored for 12 weeks under an environment of 23° C. The laminated glass stored for 12 weeks was stored for one hour in a thermostatic chamber at 20° C., and then the mechanical impedance in the thermostatic chamber at 20° C. was measured by the central exciting method in accordance with ISO 16940:2008. A loss factor $\eta c$ in the primary mode after 12 weeks was calculated from the obtained transfer function by the half band width method. The sound insulating properties at 20° C. were judged from the calculated $\eta c$ according to the following criteria.

[Criteria for Judgment in Sound Insulating Properties at 20° C.]
- ⊙⊙: ηc is 0.2 or more
- ⊙: ηc is 0.15 or more and less than 0.2
- x: ηc is less than 0.15

(4) Sound Insulating Properties at 30° C.

The sound insulating properties at 30° C. were judged from the above measured loss factor ηb in the primary mode at 30° C. after 12 weeks according to the following criteria.

[Criteria for Judgment in Sound Insulating Properties at 30° C.]
- ⊙⊙: ηb is 0.2 or more
- ⊙: ηb is 0.15 or more and less than 0.2
- x: ηb is less than 0.15

The details and the results are shown in the following Tables 1 and 2. In this connection, in the following Tables 1 and 2, the description of ingredients to be blended other than the polyvinyl acetal resin and the plasticizer was omitted.

TABLE 1

| | | | | Example 1 | Example 2 | Example 3 | Example 4 | Example 5 | Example 6 | Example 7 | Example 8 | Example 9 | Comparative Example 1 |
|---|---|---|---|---|---|---|---|---|---|---|---|---|---|
| Composition for forming second and third layers | Thickness | | μm | 340 | 340 | 340 | 340 | 340 | 340 | 340 | 340 | 340 | 340 |
| | Polyvinyl acetal resin | Average polymerization degree of PVA | | 1700 | 1700 | 1700 | 1700 | 1700 | 1700 | 1700 | 1700 | 1700 | 1700 |
| | | Content of hydroxyl group | mol % | 30.5 | 30.5 | 30.5 | 30.5 | 30.5 | 30.5 | 30.5 | 30.5 | 30.5 | 30.5 |
| | | Acetylation degree | mol % | 0.8 | 0.8 | 0.8 | 0.8 | 0.8 | 0.8 | 0.8 | 0.8 | 0.8 | 0.8 |
| | | Acetalization degree | mol % | 68.7 | 68.7 | 68.7 | 68.7 | 68.7 | 68.7 | 68.7 | 68.7 | 68.7 | 68.7 |
| | | Content | parts by weight | 100 | 100 | 100 | 100 | 100 | 100 | 100 | 100 | 100 | 100 |
| | Plasticizer | Kind | | 3GO | 3GO | 3GO | 3GO | 3GO | 3GO | 3GO | 3GO | 3GO | 3GO |
| | | Content | parts by weight | 35 | 30 | 33 | 30 | 33 | 30 | 30 | 33 | 30 | 40 |
| | Cloud point 2 and cloud point 3 | | ° C. | 120 | 120 | 120 | 120 | 120 | 120 | 120 | 120 | 120 | 120 |
| Composition for forming first layer | Each thickness | | μm | 100 | 100 | 100 | 100 | 100 | 100 | 100 | 100 | 100 | 100 |
| | Polyvinyl acetal resin | Average polymerization degree of PVA | | 2300 | 2300 | 2300 | 2300 | 3300 | 3300 | 2300 | 2300 | 2300 | 2300 |
| | | Content of hydroxyl group | mol % | 23.3 | 23.3 | 23.9 | 23.9 | 24.5 | 24.5 | 22.4 | 24.5 | 24.5 | 22.4 |
| | | Acetylation degree | mol % | 12.2 | 12.2 | 12.2 | 12.2 | 12.2 | 12.2 | 17.3 | 21 | 21 | 17.3 |
| | | Acetalization degree | mol % | 64.6 | 64.6 | 63.9 | 63.9 | 63.3 | 63.3 | 60.3 | 54.5 | 54.5 | 60.3 |
| | | Content | parts by weight | 100 | 100 | 100 | 100 | 100 | 100 | 100 | 100 | 100 | 100 |
| | Plasticizer | Kind | | 3GO | 3GO | 3GO | 3GO | 3GO | 3GO | 3GO | 3GO | 3GO | 3GO |
| | | Content | parts by weight | 60 | 60 | 60 | 60 | 60 | 60 | 60 | 60 | 60 | 60 |
| | Cloud point 1 | | ° C. | 22.5 | 22.5 | 26.9 | 26.9 | 30.9 | 30.9 | 7.7 | 18.6 | 18.6 | 7.7 |
| Xa and Xb | | | ° C. | 97.5 | 97.5 | 93.1 | 93.1 | 89.1 | 89.1 | 112.3 | 101.4 | 101.4 | 112.3 |
| $-0.16Xa + 59$ and $-0.16Xb + 59$ | | | | 43.4 | 43.4 | 44.1 | 44.1 | 44.7 | 44.7 | 41.0 | 42.8 | 42.8 | 41.0 |
| $-0.16Xa - 0.2Y + 59$ and $-0.16Xb - 0.2Y + 59$ | | | | 41.0 | 41.0 | 41.7 | 41.7 | 42.3 | 42.3 | 37.6 | 38.6 | 38.6 | 37.6 |
| Z | | | parts by weight | 37.8 | 33.2 | 35.9 | 33.2 | 35.9 | 33.2 | 33.2 | 35.9 | 33.2 | 42.3 |
| Evaluation | Change in sound insulating properties at 30° C. | | | −24 | 6 | 0 | 10 | −11 | 12 | −8 | −22 | −13 | −34 |
| | Sound insulating properties at 20° C. | | | ⊙⊙ | ⊙⊙ | ⊙⊙ | ⊙⊙ | ⊙⊙ | ⊙⊙ | ⊙⊙ | ⊙⊙ | ⊙⊙ | ⊙⊙ |
| | Sound insulating properties at 30° C. | | | ⊙⊙ | ⊙⊙ | ⊙⊙ | ⊙⊙ | ⊙⊙ | ⊙⊙ | ⊙⊙ | ⊙⊙ | ⊙⊙ | ⊙ |

TABLE 2

| | | | | Example 10 | Example 11 | Example 12 | Example 13 | Example 14 | Example 15 | Example 16 |
|---|---|---|---|---|---|---|---|---|---|---|
| Composition for forming second and third layers | Thickness | | μm | 340 | 340 | 340 | 340 | 340 | 340 | 340 |
| | Polyvinyl acetal resin | Average polymerization degree of PVA | | 1700 | 1700 | 1700 | 1700 | 1700 | 1700 | 1700 |
| | | Content of hydroxyl group | mol % | 34.5 | 34.5 | 34.5 | 30.4 | 30.4 | 30.4 | 30.4 |
| | | Acetylation degree | mol % | 0.8 | 0.8 | 0.8 | 0.9 | 0.9 | 0.9 | 0.9 |
| | | Acetalization degree | mol % | 64.7 | 64.7 | 64.7 | 68.7 | 68.7 | 68.7 | 68.7 |

TABLE 2-continued

| | | | | | | | | | | |
|---|---|---|---|---|---|---|---|---|---|---|
| | | Content | parts by weight | 100 | 100 | 100 | 100 | 100 | 100 | 100 |
| | Plasticizer | Kind | | 3GO | 3GO | 3GO | 3GO | 3GO | 3GO | 3GO |
| | | Content | parts by weight | 32 | 30 | 28 | 39.5 | 37.5 | 35.5 | 33.5 |
| | Cloud point 2 and cloud point 3 | | ° C. | 160 | 160 | 160 | 119 | 119 | 119 | 119 |
| Composition for forming first layer | Each thickness | | μm | 100 | 100 | 100 | 100 | 100 | 100 | 100 |
| | Polyvinyl acetal resin | Average polymerization degree of PVA | | 3100 | 3100 | 3100 | 3050 | 3050 | 3050 | 3050 |
| | | Content of hydroxyl group | mol % | 24.3 | 24.3 | 24.3 | 24.2 | 24.2 | 24.2 | 24.2 |
| | | Acetylation degree | mol % | 11.6 | 11.6 | 11.6 | 11.4 | 11.4 | 11.4 | 11.4 |
| | | Acetalization degree | mol % | 64.1 | 64.1 | 64.1 | 64.4 | 64.4 | 64.4 | 64.4 |
| | | Content | parts by weight | 100 | 100 | 100 | 100 | 100 | 100 | 100 |
| | Plasticizer | Kind | | 3GO | 3GO | 3GO | 3GO | 3GO | 3GO | 3GO |
| | | Content | parts by weight | 60 | 60 | 60 | 60 | 60 | 60 | 60 |
| | Cloud point 1 | | ° C. | 30 | 30 | 30 | 29 | 29 | 29 | 29 |
| Xa and Xb | | | ° C. | 130.5 | 130.5 | 130.5 | 90.1 | 90.1 | 90.1 | 90.1 |
| $-0.16Xa + 59$ and $-0.16Xb + 59$ | | | | 38.1 | 38.1 | 38.1 | 44.6 | 44.6 | 44.6 | 44.6 |
| $-0.16Xa - 0.2Y + 59$ and $-0.16Xb - 0.2Y + 59$ | | | | 35.8 | 35.8 | 35.8 | 42.3 | 42.3 | 42.3 | 42.3 |
| Z | | | parts by weight | 35.0 | 33.2 | 31.4 | 41.8 | 40.0 | 38.2 | 36.4 |
| Evaluation | Change in sound insulating properties at 30° C. | | | −21 | −15 | −9 | −22 | −16 | −10 | −4 |
| | Sound insulating properties at 20° C. | | | ○○ | ○○ | ○○ | ○○ | ○○ | ○○ | ○○ |
| | Sound insulating properties at 30° C. | | | ○○ | ○○ | ○○ | ○○ | ○○ | ○○ | ○○ |

| | | | | Example 17 | Example 18 | Example 19 | Example 20 | Example 21 | Example 22 | Example 23 |
|---|---|---|---|---|---|---|---|---|---|---|
| Composition for forming second and third layers | Thickness | | μm | 340 | 290 | 290 | 290 | 303 | 303 | 303 |
| | Polyvinyl acetal resin | Average polymerization degree of PVA | | 1700 | 1700 | 1700 | 1700 | 1700 | 1700 | 1700 |
| | | Content of hydroxyl group | mol % | 30.4 | 30.8 | 30.8 | 30.8 | 30.8 | 30.8 | 30.8 |
| | | Acetylation degree | mol % | 0.9 | 0.8 | 0.8 | 0.8 | 0.8 | 0.8 | 0.8 |
| | | Acetalization degree | mol % | 68.7 | 68.4 | 68.4 | 68.4 | 68.4 | 68.4 | 68.4 |
| | | Content | parts by weight | 100 | 100 | 100 | 100 | 100 | 100 | 100 |
| | Plasticizer | Kind | | 3GO | 3GO | 3GO | 3GO | 3GO | 3GO | 3GO |
| | | Content | parts by weight | 31.5 | 30 | 32 | 34 | 31 | 33 | 35 |
| | Cloud point 2 and cloud point 3 | | ° C. | 119 | 123 | 123 | 123 | 123 | 123 | 123 |
| Composition for forming first layer | Each thickness | | μm | 100 | 200 | 200 | 200 | 175 | 175 | 175 |
| | Polyvinyl acetal resin | Average polymerization degree of PVA | | 3050 | 3000 | 3000 | 3000 | 3000 | 3000 | 3000 |
| | | Content of hydroxyl group | mol % | 24.2 | 24.4 | 24.4 | 24.4 | 24.4 | 24.4 | 24.4 |
| | | Acetylation degree | mol % | 11.4 | 12 | 12 | 12 | 12 | 12 | 12 |
| | | Acetalization degree | mol % | 64.4 | 63.6 | 63.6 | 63.6 | 63.6 | 63.6 | 63.6 |
| | | Content | parts by weight | 100 | 100 | 100 | 100 | 100 | 100 | 100 |
| | Plasticizer | Kind | | 3GO | 3GO | 3GO | 3GO | 3GO | 3GO | 3GO |
| | | Content | parts by weight | 60 | 60 | 60 | 60 | 60 | 60 | 60 |
| | Cloud point 1 | | ° C. | 29 | 30 | 30 | 30 | 30 | 30 | 30 |
| Xa and Xb | | | ° C. | 90.1 | 92.8 | 92.8 | 92.8 | 92.8 | 92.8 | 92.8 |
| $-0.16Xa + 59$ and $-0.16Xb + 59$ | | | | 44.6 | 44.2 | 44.2 | 44.2 | 44.2 | 44.2 | 44.2 |
| $-0.16Xa - 0.2Y + 59$ and $-0.16Xb - 0.2Y + 59$ | | | | 42.3 | 41.8 | 41.8 | 41.8 | 41.8 | 41.8 | 41.8 |
| Z | | | parts by weight | 34.6 | 36.6 | 38.2 | 39.8 | 36.5 | 38.2 | 39.9 |

| | | | | | | | |
|---|---|---|---|---|---|---|---|
| Evaluation | Change in sound insulating properties at 30° C. | 3 | −6 | −12 | −17 | −6 | −12 | −17 |
| | Sound insulating properties at 20° C. | ◯◯ | ◯◯ | ◯◯ | ◯◯ | ◯◯ | ◯◯ | ◯◯ |
| | Sound insulating properties at 30° C. | ◯◯ | ◯◯ | ◯◯ | ◯◯ | ◯◯ | ◯◯ | ◯◯ |

EXPLANATION OF SYMBOLS

1: First layer
1a: First surface
1b: Second surface
2: Second layer
2a: Outer surface
3: Third layer
3a: Outer surface
11: Interlayer film
11a: First surface
11b: Second surface
21: First lamination glass member
22: Second lamination glass member
31: Laminated glass

The invention claimed is:

1. An interlayer film for laminated glass having a three or more layer structure, the interlayer film for laminated glass comprising:
a first layer;
a second layer layered on a first surface of the first layer; and
a third layer layered on a second surface opposite to the first surface of the first layer,
the first layer containing a thermoplastic resin and a plasticizer,
the second layer containing a thermoplastic resin and a plasticizer,
the third layer containing a thermoplastic resin and a plasticizer,
the thermoplastic resin contained in each of the first layer, the second layer, and the third layer being at least one selected from the group consisting of a polyvinyl acetal resin, an ethylene-vinyl acetate copolymer resin, an ethylene-acrylic acid copolymer resin, a polyurethane resin and a polyvinyl alcohol resin,
the plasticizer contained in each of the first layer, the second layer, and the third layer being at least one selected from the group consisting of an organic ester plasticizer, an organic phosphate plasticizer and an organic phosphite plasticizer,
a content of the plasticizer in the second layer relative to 100 parts by weight of the thermoplastic resin in the second layer being 35 parts by weight or less, and
when an absolute value of a difference between a cloud point measured by using a liquid prepared by dissolving 8 parts by weight of the thermoplastic resin in the first layer in 100 parts by weight of the plasticizer in the first layer and a cloud point measured by using a liquid prepared by dissolving 8 parts by weight of the thermoplastic resin in the second layer in 100 parts by weight of the plasticizer in the second layer being represented by Xa, and a content based on parts by weight of an entire plasticizer in the interlayer film for laminated glass relative to 100 parts by weight of an entire thermoplastic resin in the interlayer film for laminated glass being represented by Z, the interlayer film satisfying at least one of a first constitution and a second constitution below:

First constitution: $Xa \leq 115$ and $Z \leq -0.16Xa+59$, and
Second constitution: the thermoplastic resin in the first layer is a polyvinyl acetal resin, and when an acetylation degree based on a mole percent of the polyvinyl acetal resin in the first layer is represented by Y, $Y \geq 2$ and $Z \leq -0.16Xa-0.2Y+59$,
wherein the content Z of the plasticizer is calculated as $[\{X1(mg) \times P1+X2(mg) \times P2+X3(mg) \times P3\}/\{X1(mg) \times R1+X2(mg) \times R2+X3(mg) \times R3\}]$, wherein
X1 is a weight of the first layer,
R1 is a content of the thermoplastic resin which accounts for the total of the thermoplastic resin and the plasticizer in the first layer,
P1 is a content of the plasticizer which accounts for the total of the thermoplastic resin and the plasticizer in the first layer,
X2 is a weight of the second layer,
R2 is a content of the thermoplastic resin which accounts for the total of the thermoplastic resin and the plasticizer in the second layer,
P2 is a content of the plasticizer which accounts for the total of the thermoplastic resin and the plasticizer in the second layer,
X3 is a weight of the third layer,
R3 is a content of the thermoplastic resin which accounts for the total of the thermoplastic resin and the plasticizer in the third layer, and
P3 is a content of the plasticizer which accounts for the total of the thermoplastic resin and the plasticizer in the third layer, and
wherein, when the interlayer film for laminated glass has more than the three-layer structure, the content Z of the plasticizer in the interlayer film is measured as in the case where the interlayer film has the three-layer structure.

2. The interlayer film for laminated glass according to claim 1, which satisfies the first constitution.

3. The interlayer film for laminated glass according to claim 1, which satisfies the second constitution.

4. The interlayer film for laminated glass according to claim 1, wherein
the thermoplastic resin in the first layer is a polyvinyl acetal resin, and
the thermoplastic resin in the second layer is a polyvinyl acetal resin.

5. The interlayer film for laminated glass according to claim 1, wherein
the thermoplastic resin in the first layer is a polyvinyl acetal resin, and
the acetylation degree of the polyvinyl acetal resin in the first layer is less than 24% by mole.

6. The interlayer film for laminated glass according to claim 1, wherein
the thermoplastic resin in the first layer is a polyvinyl acetal resin, and
a content of a hydroxyl group of the polyvinyl acetal resin in the first layer is 22% by mole or more.

7. The interlayer film for laminated glass according to claim 1, wherein a content of the plasticizer in the first layer relative to 100 parts by weight of the thermoplastic resin in the first layer is larger than the content of the plasticizer in the second layer relative to 100 parts by weight of the thermoplastic resin in the second layer.

8. The interlayer film for laminated glass according to claim 1, wherein a content of the plasticizer in the first layer relative to 100 parts by weight of the thermoplastic resin in the first layer is 50 parts by weight or more and 100 parts by weight or less.

9. The interlayer film for laminated glass according to claim 1, wherein the content of the plasticizer in the second layer relative to 100 parts by weight of the thermoplastic resin in the second layer is more than 25 parts by weight and 35 parts by weight or less.

10. The interlayer film for laminated glass according to claim 1, wherein
the thermoplastic resin in the first layer is a polyvinyl acetal resin,
the thermoplastic resin in the second layer is a polyvinyl acetal resin, and
a content of the hydroxyl group of the polyvinyl acetal resin in the first layer is lower than a content of a hydroxyl group of the polyvinyl acetal resin in the second layer.

11. The interlayer film for laminated glass according to claim 1, which has a three or more-layer structure, wherein
when an absolute value of a difference between a cloud point measured by using a liquid prepared by dissolving 8 parts by weight of the thermoplastic resin in the first layer in 100 parts by weight of the plasticizer in the first layer and a cloud point measured by using a liquid prepared by dissolving 8 parts by weight of the thermoplastic resin in the third layer in 100 parts by weight of the plasticizer in the third layer is represented by Xb, and the content based on parts by weight of the entire plasticizer in the interlayer film for laminated glass relative to 100 parts by weight of the entire thermoplastic resin in the interlayer film for laminated glass is represented by Z, the interlayer film satisfies at least one of a third constitution and a fourth constitution below:
Third constitution: $Xb \leq 115$ and $Z \leq -0.16Xb+59$
Fourth constitution: the thermoplastic resin in the first layer is a polyvinyl acetal resin, and when an acetylation degree based on a mole percent of the polyvinyl acetal resin in the first layer is represented by Y, $Y \geq 2$ and $Z \leq -0.16Xb - 0.2Y + 59$.

12. The interlayer film for laminated glass according to claim 11, which satisfies the third constitution.

13. The interlayer film for laminated glass according to claim 11, which satisfies the fourth constitution.

14. The interlayer film for laminated glass according to claim 11, wherein
the thermoplastic resin in the first layer is a polyvinyl acetal resin,
the thermoplastic resin in the second layer is a polyvinyl acetal resin, and
the thermoplastic resin in the third layer is a polyvinyl acetal resin.

15. The interlayer film for laminated glass according to claim 11, wherein
a content of the plasticizer in the first layer relative to 100 parts by weight of the thermoplastic resin in the first layer is larger than the content of the plasticizer in the second layer relative to 100 parts by weight of the thermoplastic resin in the second layer, and
the content of the plasticizer in the first layer relative to 100 parts by weight of the thermoplastic resin in the first layer is larger than a content of the plasticizer in the third layer relative to 100 parts by weight of the thermoplastic resin in the third layer.

16. The interlayer film for laminated glass according to claim 11, wherein
the content of the plasticizer in the third layer relative to 100 parts by weight of the thermoplastic resin in the third layer is 50 parts by weight or less.

17. The interlayer film for laminated glass according to claim 11, wherein
the thermoplastic resin in the first layer is a polyvinyl acetal resin,
the thermoplastic resin in the second layer is a polyvinyl acetal resin,
the thermoplastic resin in the third layer is a polyvinyl acetal resin,
a content of a hydroxyl group of the polyvinyl acetal resin in the first layer is lower than a content of a hydroxyl group of the polyvinyl acetal resin in the second layer, and
the content of the hydroxyl group of the polyvinyl acetal resin in the first layer is lower than a content of a hydroxyl group of the polyvinyl acetal resin in the third layer.

18. The interlayer film for laminated glass according to claim 11, which satisfies $Xa \leq 105$ and $Z \leq -0.16Xa+59$.

19. The interlayer film for laminated glass according to claim 11, which satisfies $Xb \leq 105$ and $Z \leq -0.16Xb+59$.

20. The interlayer film for laminated glass according to claim 1, which satisfies $Z \geq -0.16Xa - 0.2Y + 40$.

21. The interlayer film for laminated glass according to claim 1, which satisfies $Xa \leq 105$ and $Z \leq -0.16Xa+59$.

22. A laminated glass, comprising:
a first lamination glass member;
a second lamination glass member; and
the interlayer film for laminated glass according to claim 1,
the interlayer film for laminated glass being arranged between the first lamination glass member and the second lamination glass member.

* * * * *